(12) United States Patent
Iwata et al.

(10) Patent No.: US 11,043,194 B2
(45) Date of Patent: Jun. 22, 2021

(54) IMAGE DISPLAY SYSTEM, STORAGE MEDIUM HAVING STORED THEREIN IMAGE DISPLAY PROGRAM, IMAGE DISPLAY METHOD, AND DISPLAY DEVICE

(71) Applicant: Nintendo Co., Ltd., Kyoto (JP)

(72) Inventors: Kenji Iwata, Kyoto (JP); Ryuhei Matsuura, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 0 days.

(21) Appl. No.: 16/782,154

(22) Filed: Feb. 5, 2020

(65) Prior Publication Data

US 2020/0273434 A1 Aug. 27, 2020

(30) Foreign Application Priority Data

Feb. 27, 2019 (JP) .............................. JP2019-033866
Feb. 27, 2019 (JP) .............................. JP2019-033867

(51) Int. Cl.
*G09G 5/38* (2006.01)
*A63F 13/2145* (2014.01)
(Continued)

(52) U.S. Cl.
CPC ........... *G09G 5/38* (2013.01); *A63F 13/2145* (2014.09); *G06F 3/041* (2013.01);
(Continued)

(58) Field of Classification Search
CPC .... G09G 5/38; G09G 5/14; G09G 2340/0464; G09G 2354/00; H04N 13/344;
(Continued)

(56) References Cited

U.S. PATENT DOCUMENTS 8,605,008 B1 * 12/2013 Prest .................. G02B 27/0176
345/8
9,857,595 B2 * 1/2018 Costa ................. G02B 27/0176
(Continued)

FOREIGN PATENT DOCUMENTS

DE 10 2015 216 424 A1 3/2017
JP 2018-198651 12/2018

OTHER PUBLICATIONS

Partial European Search Report dated Apr. 3, 2020 issued in European Application No. 20157135.3 (20 pgs.).
(Continued)

*Primary Examiner* — Grant Sitta
(74) *Attorney, Agent, or Firm* — Nixon & Vanderhye, P.C.

(57) ABSTRACT

A display device having a display screen and a goggle apparatus to which the display device is attachable are included. In a first display mode, a first image including a content image that is a non-stereoscopic image, and a first user interface image is displayed on a display screen, and in a second display mode, a second image including a content image composed of a left-eye image and a right-eye image having parallax with each other, and a second user interface image corresponding to the first user interface image is displayed on the display screen. Then, in the second display mode, the second user interface image is displayed at a position different from a position on the display screen where the first user interface image is displayed in the first display mode.

20 Claims, 16 Drawing Sheets

(51) Int. Cl.
*G06F 3/041* (2006.01)
*G09G 5/14* (2006.01)
*H04N 13/344* (2018.01)
*H04N 13/356* (2018.01)
*G06F 3/0488* (2013.01)

(52) U.S. Cl.
CPC ........... *G06F 3/04886* (2013.01); *G09G 5/14* (2013.01); *H04N 13/344* (2018.05); *H04N 13/356* (2018.05); *G09G 2340/0464* (2013.01); *G09G 2354/00* (2013.01)

(58) Field of Classification Search
CPC .. H04N 13/356; H04N 13/359; H04N 13/398; H04N 13/183; G06F 3/04886; G06F 3/041; G06F 1/1694; G06F 3/0488; G06F 1/1684; G06F 1/1656; G06F 1/163; G06F 3/0346; G06F 3/011; A63F 13/2145
See application file for complete search history.

(56) References Cited

U.S. PATENT DOCUMENTS

| | | | | |
|---|---|---|---|---|
| 9,952,711 | B2* | 4/2018 | Kim | G06F 1/1632 |
| 10,139,637 | B2* | 11/2018 | Costa | G02B 27/0176 |
| 10,614,745 | B2* | 4/2020 | Lee | G02B 7/002 |
| 10,663,738 | B2* | 5/2020 | Carlvik | G06F 1/163 |
| 2009/0295753 | A1* | 12/2009 | King | G06F 1/1637 345/174 |
| 2010/0079356 | A1* | 4/2010 | Hoellwarth | G06F 3/16 345/8 |
| 2011/0126159 | A1 | 5/2011 | Ko et al. | |
| 2011/0199639 | A1 | 8/2011 | Tani et al. | |
| 2012/0050265 | A1 | 3/2012 | Heng | |
| 2014/0267637 | A1* | 9/2014 | Hoberman | G06F 1/1626 348/53 |
| 2015/0136645 | A1 | 5/2015 | Bhattacharya | |
| 2015/0234192 | A1 | 8/2015 | Lyons | |
| 2015/0234501 | A1 | 8/2015 | Lyons | |
| 2016/0062454 | A1 | 3/2016 | Wang | |
| 2016/0063766 | A1* | 3/2016 | Han | G06F 3/012 345/633 |
| 2016/0063767 | A1* | 3/2016 | Lee | G06T 19/006 345/419 |
| 2016/0063919 | A1* | 3/2016 | Ha | G09G 3/3225 345/156 |
| 2016/0066295 | A1* | 3/2016 | Han | H04M 1/04 345/8 |
| 2016/0086386 | A1* | 3/2016 | Son | H04N 13/111 345/633 |
| 2016/0224176 | A1* | 8/2016 | Kim | G06F 1/1632 |
| 2016/0232879 | A1* | 8/2016 | Han | G02B 27/017 |
| 2017/0011706 | A1* | 1/2017 | Namkung | G06F 1/1616 |
| 2017/0064056 | A1 | 3/2017 | Uhlig et al. | |
| 2017/0090514 | A1 | 3/2017 | Byun et al. | |
| 2017/0111636 | A1 | 4/2017 | Hasegawa | |
| 2017/0153672 | A1* | 6/2017 | Shin | G06F 1/1698 |
| 2017/0285863 | A1* | 10/2017 | MacIntosh | G06F 3/0346 |
| 2019/0109938 | A1* | 4/2019 | Jeong | H04M 1/72519 |
| 2020/0272326 | A1* | 8/2020 | Sakaguchi | H04N 13/344 |

OTHER PUBLICATIONS

U.S. Appl. No. 16/782,175 to Sakaguchi et al., entitled "Information Processing System and Goggle Apparatus", filed Feb. 5, 2020 (63 pages).

Office Action in U.S. Appl. No. 16/782,175 dated Oct. 16, 2020.

* cited by examiner

FIG. 12
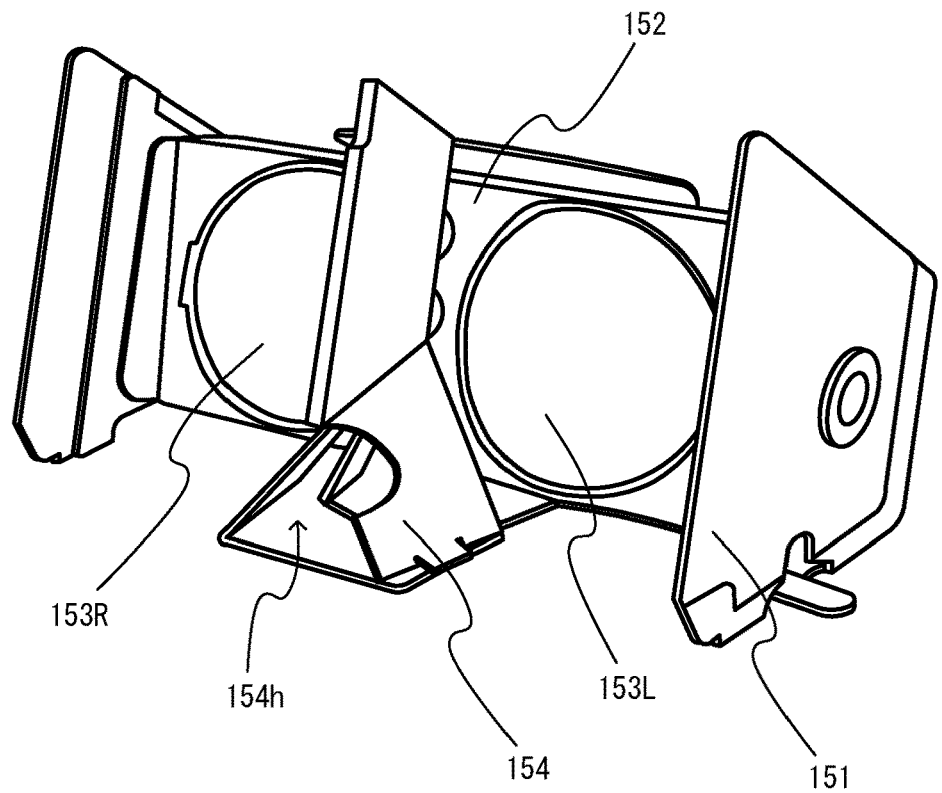
FIG. 13
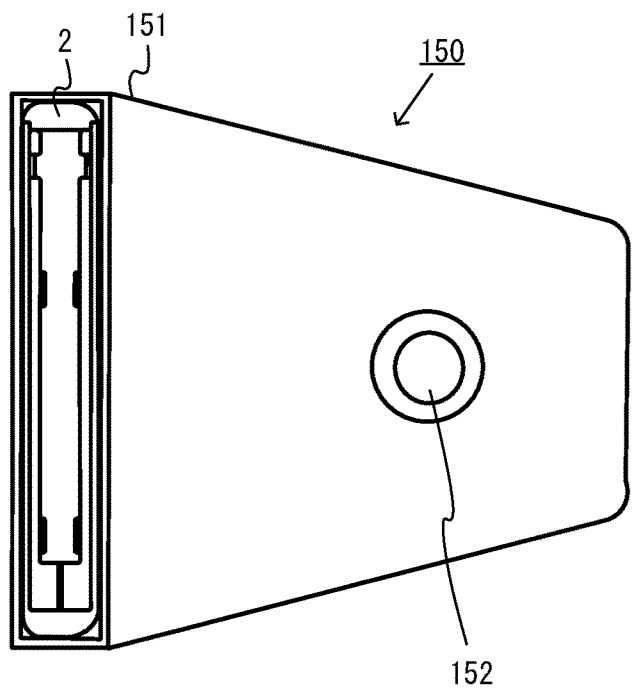
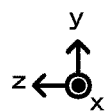

FIG. 16
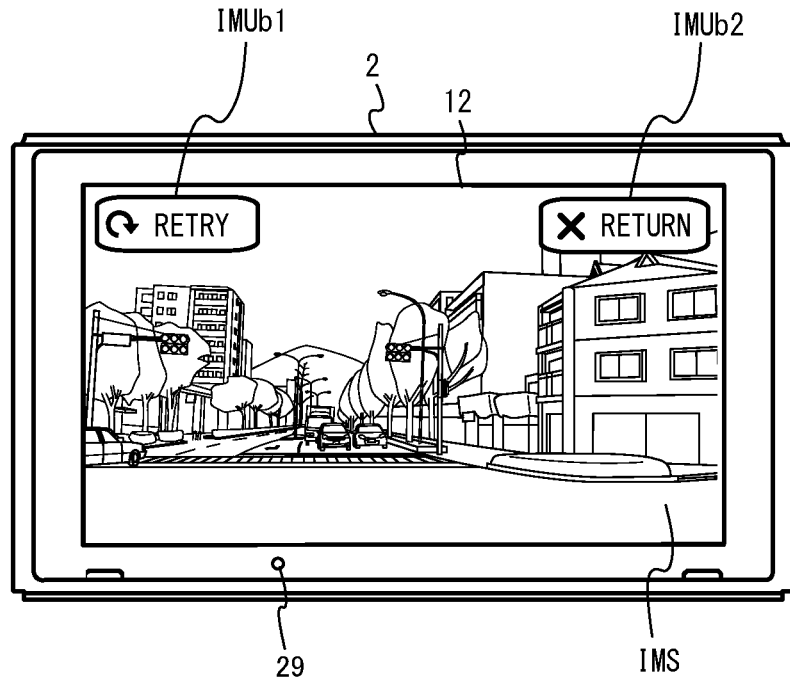
NON-STEREOSCOPIC DISPLAY MODE
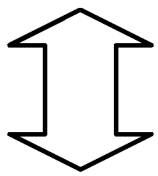
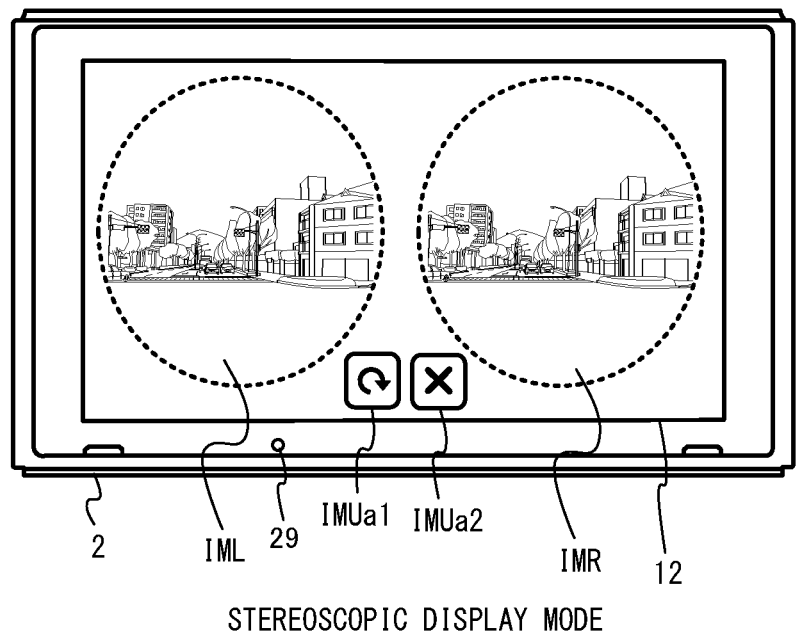
STEREOSCOPIC DISPLAY MODE

IMAGE DISPLAY SYSTEM, STORAGE MEDIUM HAVING STORED THEREIN IMAGE DISPLAY PROGRAM, IMAGE DISPLAY METHOD, AND DISPLAY DEVICE

CROSS REFERENCE TO RELATED APPLICATION

The disclosure of Japanese Patent Application No. 2019-033866, filed on Feb. 27, 2019 and the disclosure of Japanese Patent Application No. 2019-33867, filed on Feb. 27, 2019, are incorporated herein by reference.

FIELD

The technology shown here relates to an image display system, a storage medium having stored therein an image display program, an image display method, and a display device that are capable of displaying a stereoscopic image.

BACKGROUND AND SUMMARY

Conventionally, there is a three-dimensional image display device that causes a user to visually confirm two images having parallax with each other with their left and right eyes, thereby displaying a three-dimensional image. For example, in the three-dimensional image display device, a smartphone is accommodated in a goggle apparatus that the user can wear, and the user looks into a stereoscopic image displayed on a display screen of the smartphone through the goggle apparatus and thereby can view the stereoscopically displayed image.

The three-dimensional image display device, however, does not at all take into account the presentation of a user interface image for receiving a touch operation of the user when the stereoscopic image is displayed on the display screen. Thus, there is room for improvement in convenience regarding a method for presenting a user interface image.

Therefore, it is an object of an exemplary embodiment to provide an image display system, a storage medium having stored therein an image display program, an image display method, and a display device that are capable of improving convenience regarding the presentation of a user interface image.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of an image display system according to the exemplary embodiment, an image display system includes a display device having a display screen configured to display an image, and a goggle apparatus to which the display device is attachable. The image display system includes a computer configured to: set the display device to a first display mode or a second display mode different from the first display mode; in the first display mode, display on the display screen a first image including a content image that is a non-stereoscopic image, and a first user interface image; and in the second display mode, display on the display screen a second image including a content image composed of a left-eye image and a right-eye image having parallax with each other, and a second user interface image corresponding to the first user interface image. In the second display mode, the second user interface image is displayed at a position different from a position on the display screen where the first user interface image is displayed in the first display mode.

Based on the above, when a display mode is switched, a user interface image is displayed at different positions. Thus, it is possible to improve convenience regarding the presentation of a user interface image.

Further, the computer is further configured to detect whether or not the display device is in an attached state where the display device is attached to the goggle apparatus, or detect whether or not the display device is in a halfway attached state where the display device is being attached to the goggle apparatus. In this case, when the display device is set to the first display mode, the display device may be switched to the second display mode based on the detection result.

Based on the above, based on an attached state where a display device is attached to a goggle apparatus or a halfway attached state where the display device is being attached to the goggle apparatus, the display mode is switched. Thus, it is possible to seamlessly switch the display mode.

Further, the display device may include an illuminance sensor. In this case, the goggle apparatus may include a light-shielding member. The light-shielding member is configured to, when the display device is in the attached state where the display device is attached to the goggle apparatus, or is in the halfway attached state where the display device is being attached to the goggle apparatus, block light from the display device to the illuminance sensor. Based on a detection result of the illuminance sensor, it may be detected whether or not the display device is in the attached state where the display device is attached to the goggle apparatus, or it may be detected whether or not the display device is in the halfway attached state where the display device is being attached to the goggle apparatus.

Based on the above, based on a light blocking state of the display device, it is possible to easily detect whether or not the display device is in the attached state, or whether or not the display device is in the halfway attached state.

Further, the display device may include a touch panel on the display screen. In this case, the first user interface image displayed on the display screen may enable an operation instruction corresponding to a touch operation on the touch panel. The second user interface image displayed on the display screen may enable an operation instruction corresponding to a touch operation on the touch panel in a state where the display device is attached to the goggle apparatus.

Based on the above, it is possible to improve convenience regarding the presentation of a user interface image for receiving a touch operation.

Further, as the content image composed of the left-eye image and the right-eye image, an image corresponding to the content image displayed as the non-stereoscopic image may be displayed on the display screen.

Based on the above, it is possible to seamlessly switch a stereoscopic image and a non-stereoscopic image for the same content image.

Further, in the second display mode, the content image displayed in the first display mode immediately before being set in the second display mode may be displayed as a stereoscopic image composed of a left-eye image and a right-eye image on the display screen.

Based on the above, it is possible to seamlessly switch a stereoscopic image and a non-stereoscopic image for the same content image.

Further, in the second display mode, the left-eye image may be displayed in a first area of the display screen, the right-eye image may be displayed in a second area of the display screen that is different from the first area, and the second user interface image may be displayed in a third area of the display screen that is different from the first area and the second area.

Based on the above, it is possible to prevent a first area and a second area for displaying a stereoscopic image from being defaced by being subjected to a touch operation, and also prevent a finger for performing a touch operation on a second user interface image from entering the field of view in the state where the stereoscopic image is viewed.

Further, a user interface image that has substantially the same function as and has a different shape from the first user interface image may be displayed as the second user interface image.

Based on the above, it is possible to display a user interface image having a shape suitable for an operation and the display of a stereoscopic image.

Further, in the second display mode, by adjusting a shape of the second user interface image to match a shape of a third area of the display screen that is different from the first area of the display screen for displaying the left-eye image and the second area of the display screen for displaying the right-eye image, the second user interface image may be displayed in the third area.

Based on the above, it is possible to display a user interface image having an appropriate shape.

Further, the third area may be set in an upper portion or a lower portion of the display screen that is sandwiched between the first area and the second area of the display screen.

Based on the above, it is possible to display a user interface image that does not hinder the display of a stereoscopic image.

Further, the third area may be set in a lower portion of the display screen that is sandwiched between the first area and the second area of the display screen.

Based on the above, it is possible to display a user interface image that does not hinder the display of a stereoscopic image and facilitates an operation.

Further, the goggle apparatus may include an opening portion configured to, when the display device is attached to the goggle apparatus, expose the third area that is a part of the display screen at least to outside.

Based on the above, it is possible to perform a touch operation for touching a user interface image in the state where a display device is attached to a goggle apparatus.

Further, the opening portion may be formed at a position corresponding to a nose of a user when the user wears the goggle apparatus.

Based on the above, it is possible to form an opening portion without impairing a light blocking effect.

Further, in the first display mode, the first user interface image may be displayed in a superimposed manner on a content image displayed on the display screen.

Based on the above, it is possible to display a relatively large content image without being influenced by the display of a user interface image.

Further, in the second display mode, the second user interface image may be displayed as a non-stereoscopic image on the display screen.

Based on the above, the operation of touching a user interface image is facilitated.

Further, the display device may further include a display device side connection end configured to electrically connect to another apparatus. In this case, the goggle apparatus may include a goggle apparatus side connection end configured to electrically connect to the display device side connection end. In accordance with a connection between the display device side connection end and the goggle apparatus side connection end, it may be detected whether or not the display device is in an attached state where the display device is attached to the goggle apparatus, or it may be detected whether or not the display device is in a halfway attached state where the display device is being attached to the goggle apparatus.

Based on the above, it is possible to certainly detect that a display device is attached to a goggle apparatus, or certainly detect that the display device is in a halfway attached state where the display device is being attached to the goggle apparatus.

Further, the exemplary embodiment may be carried out in the forms of a storage medium having stored therein an image display program, an image display method, and a display device.

According to the exemplary embodiment, when a display mode is switched, a user interface image is displayed at different positions. Thus, it is possible to improve convenience regarding the presentation of a user interface image.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 12 is a diagram showing a non-limiting example of the internal structure of the goggle apparatus 150;

FIG. 13 is a side view showing a non-limiting example of the state of the main body apparatus 2 attached to the goggle apparatus 150;

FIG. 16 is a diagram showing non-limiting examples of images displayed on the main body apparatus 2 in a stereoscopic display mode and a non-stereoscopic display mode;

DETAILED DESCRIPTION OF NON-LIMITING EXAMPLE EMBODIMENTS

Figure 1:
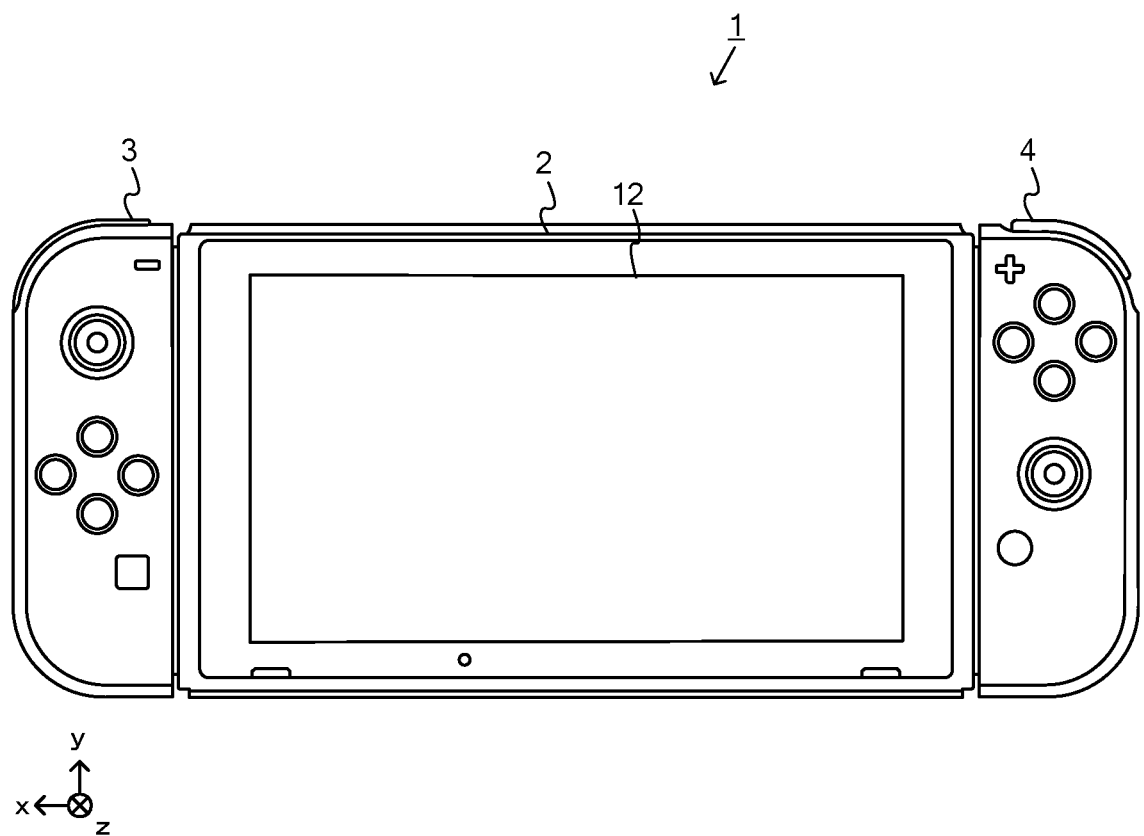
FIG. 1 is a diagram showing a non-limiting example of the state where a left controller 3 and a right controller 4 are attached to a main body apparatus 2.

An image display system according to an exemplary embodiment is described below. An example of the image display system according to the exemplary embodiment includes a game system 1 (as a minimum configuration, a main body apparatus 2 included in the game system 1) and a goggle apparatus 150. An example of the game system 1 includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
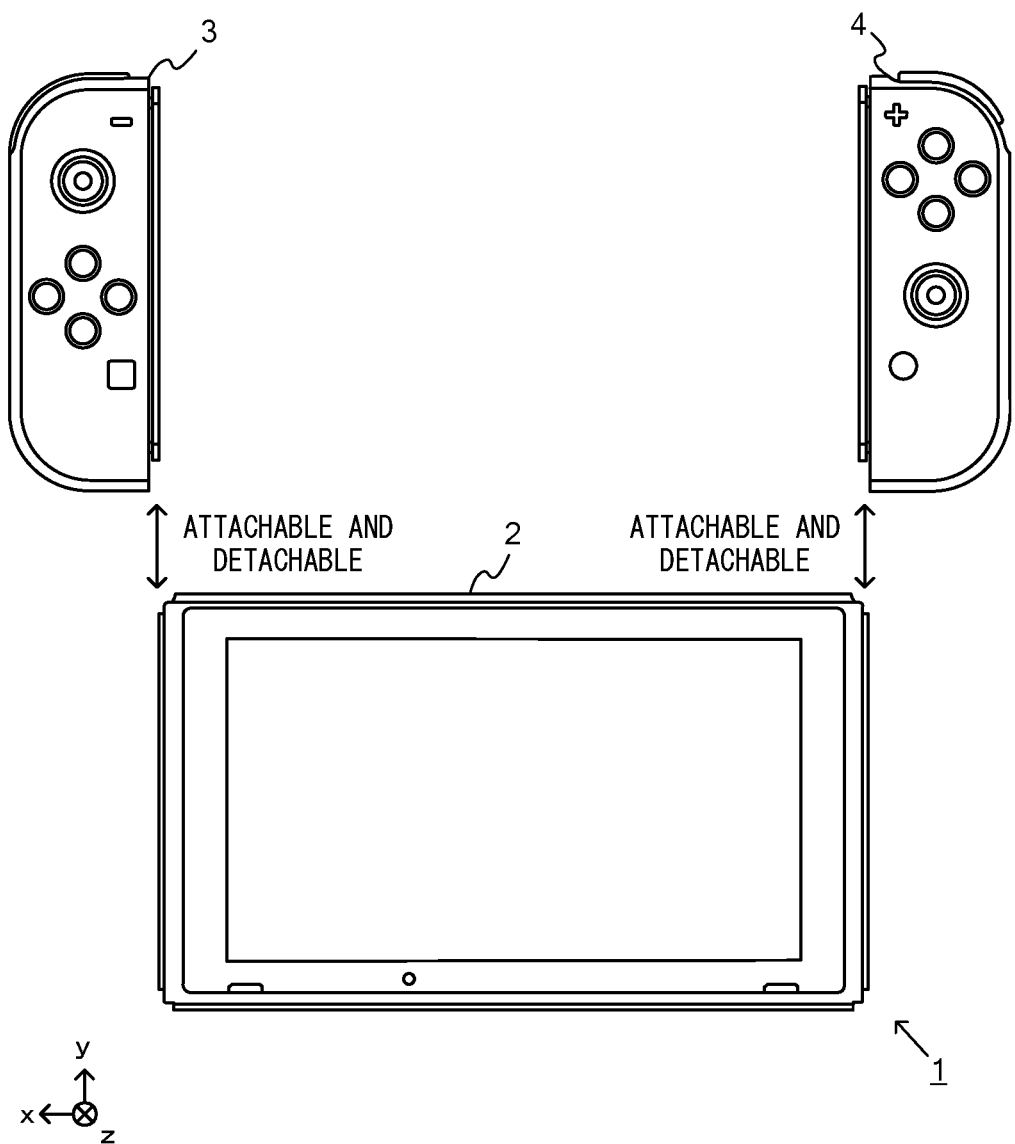
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
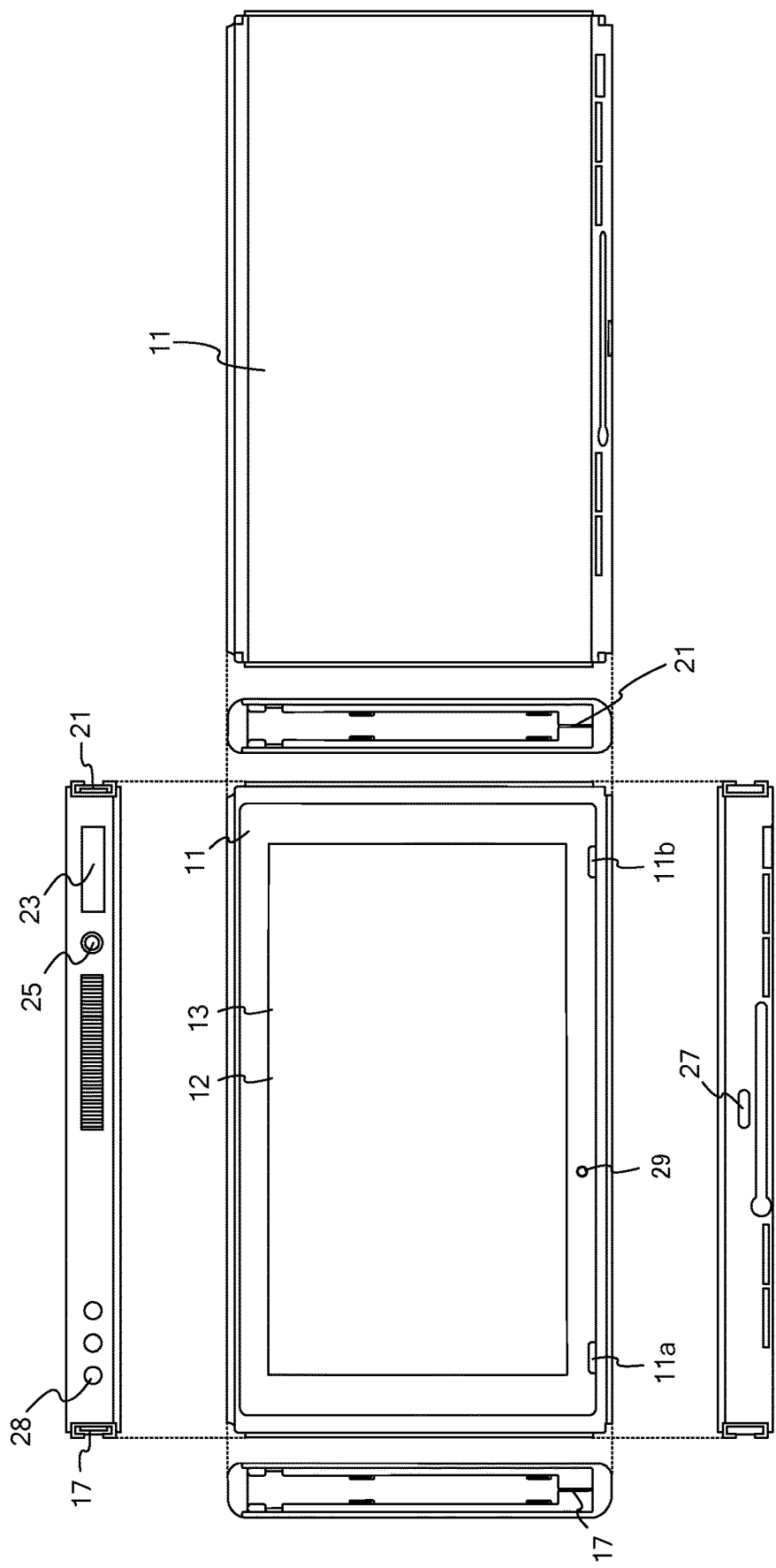
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

The main body apparatus 2 includes an illuminance sensor 29. In the exemplary embodiment, the illuminance sensor 29 is provided in a lower portion of the main surface of the housing 11 and detects the illuminance (brightness) of light incident on the main surface side of the housing 11. It should be noted that an image can be displayed by setting the display 12 to an appropriate brightness in accordance with the illuminance of the light detected by the illuminance sensor 29. In the exemplary embodiment, based on the detected illuminance, it is determined whether or not the main body apparatus 2 is attached to the goggle apparatus 150 described below.

Figure 4:
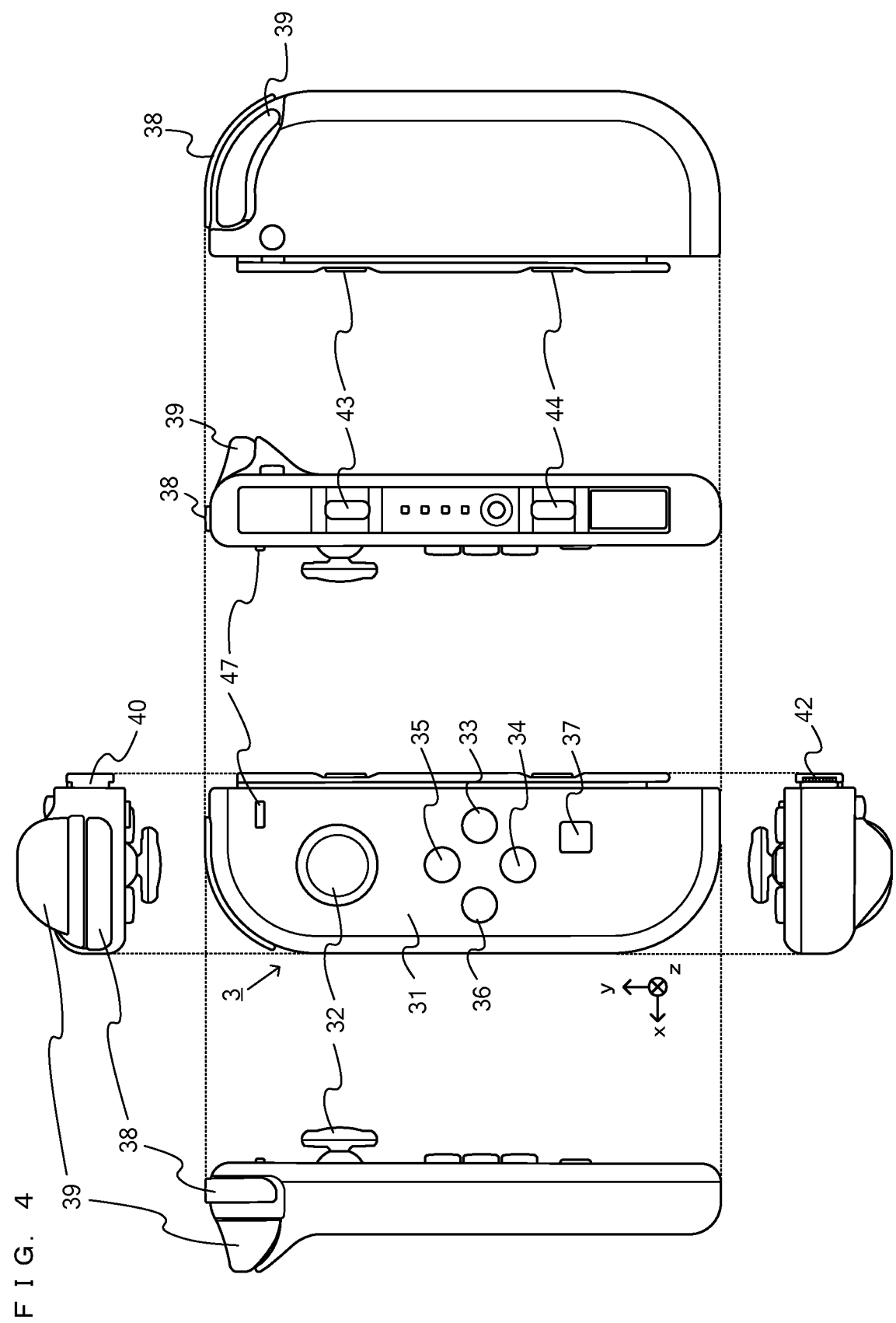
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
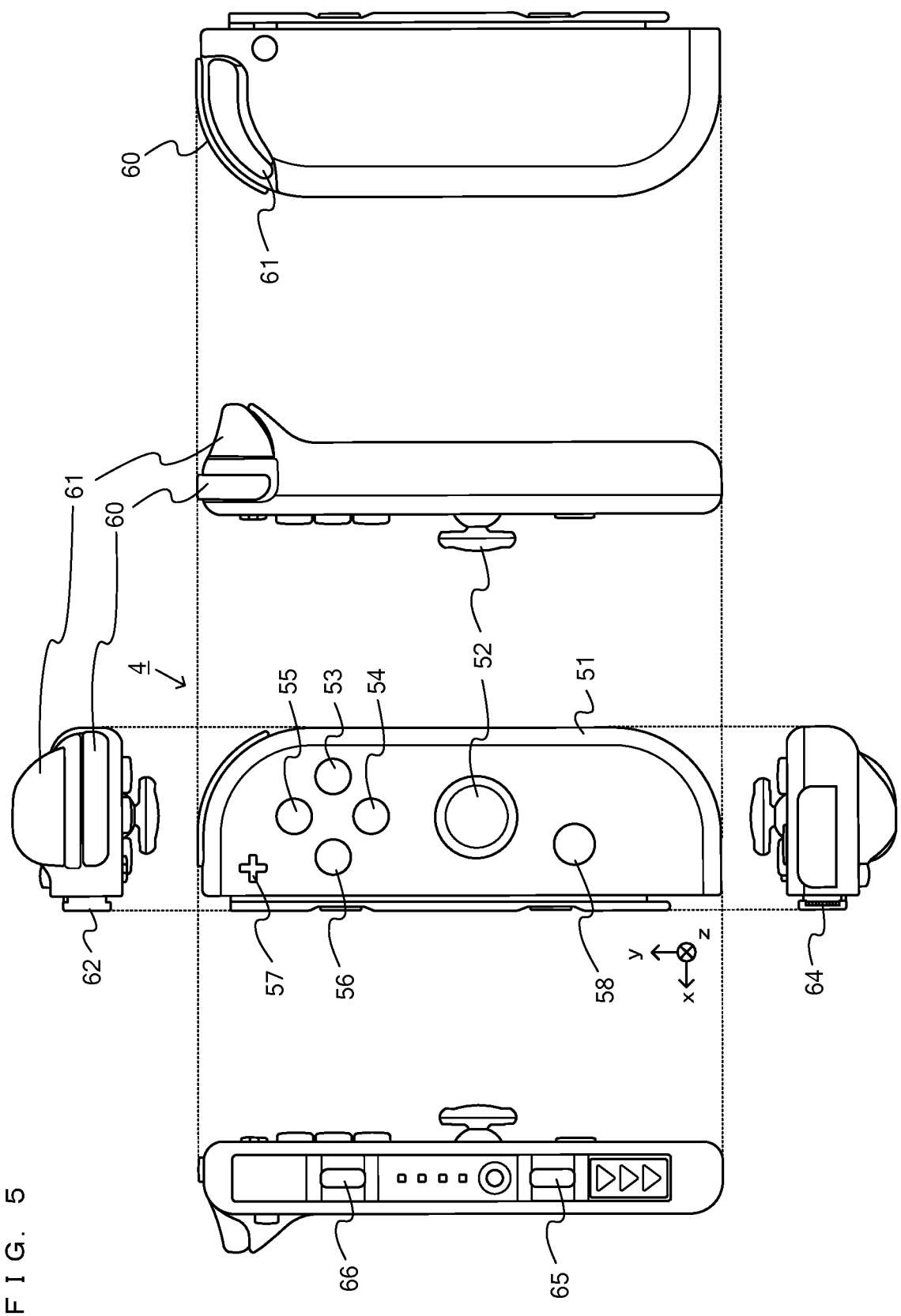
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
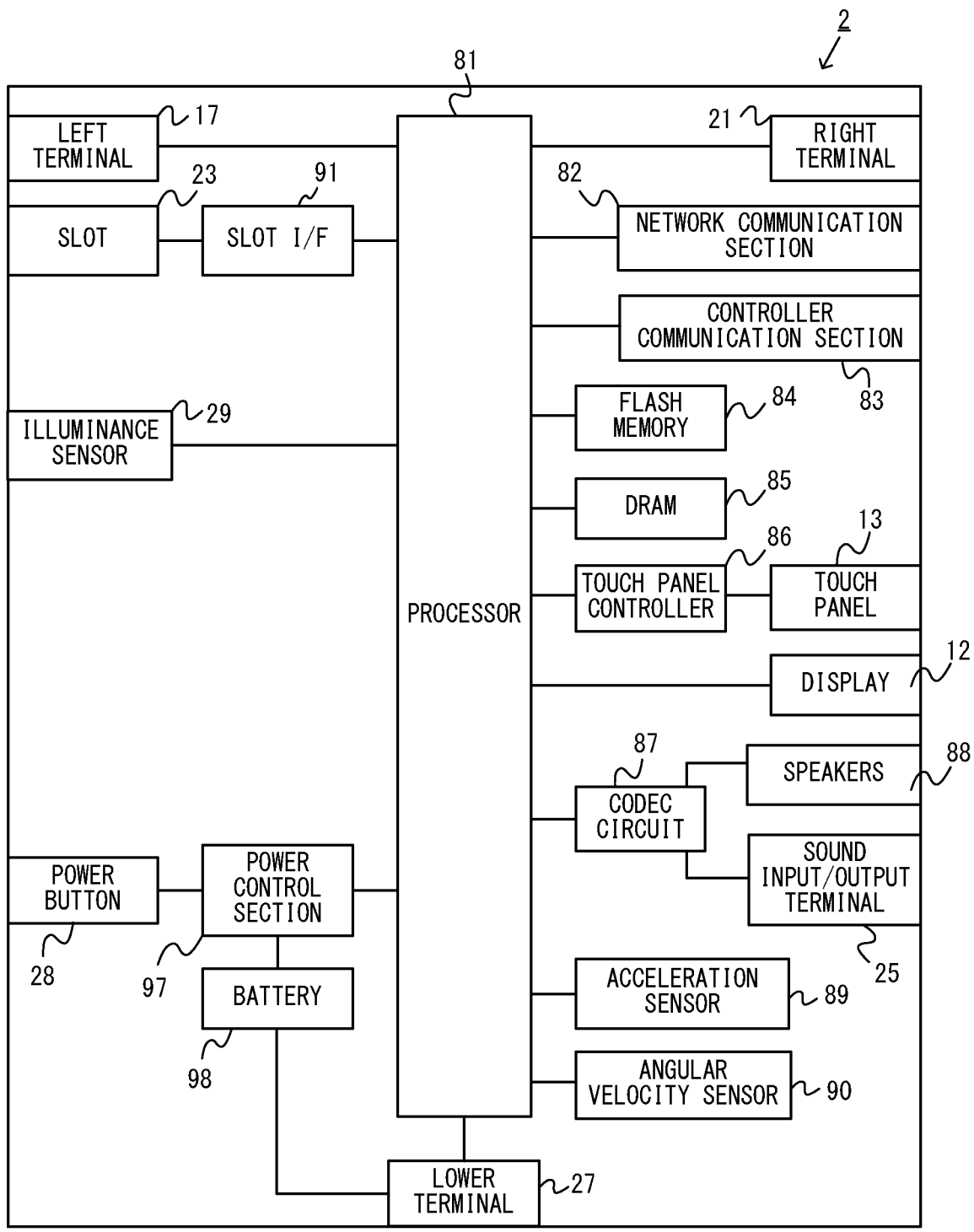
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The illuminance sensor 29 is connected to the processor 81, and the detection result of the illuminance sensor 29 is output to the processor 81. Based on the detection result of the illuminance sensor 29, the processor 81 can calculate information regarding the brightness of the periphery of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
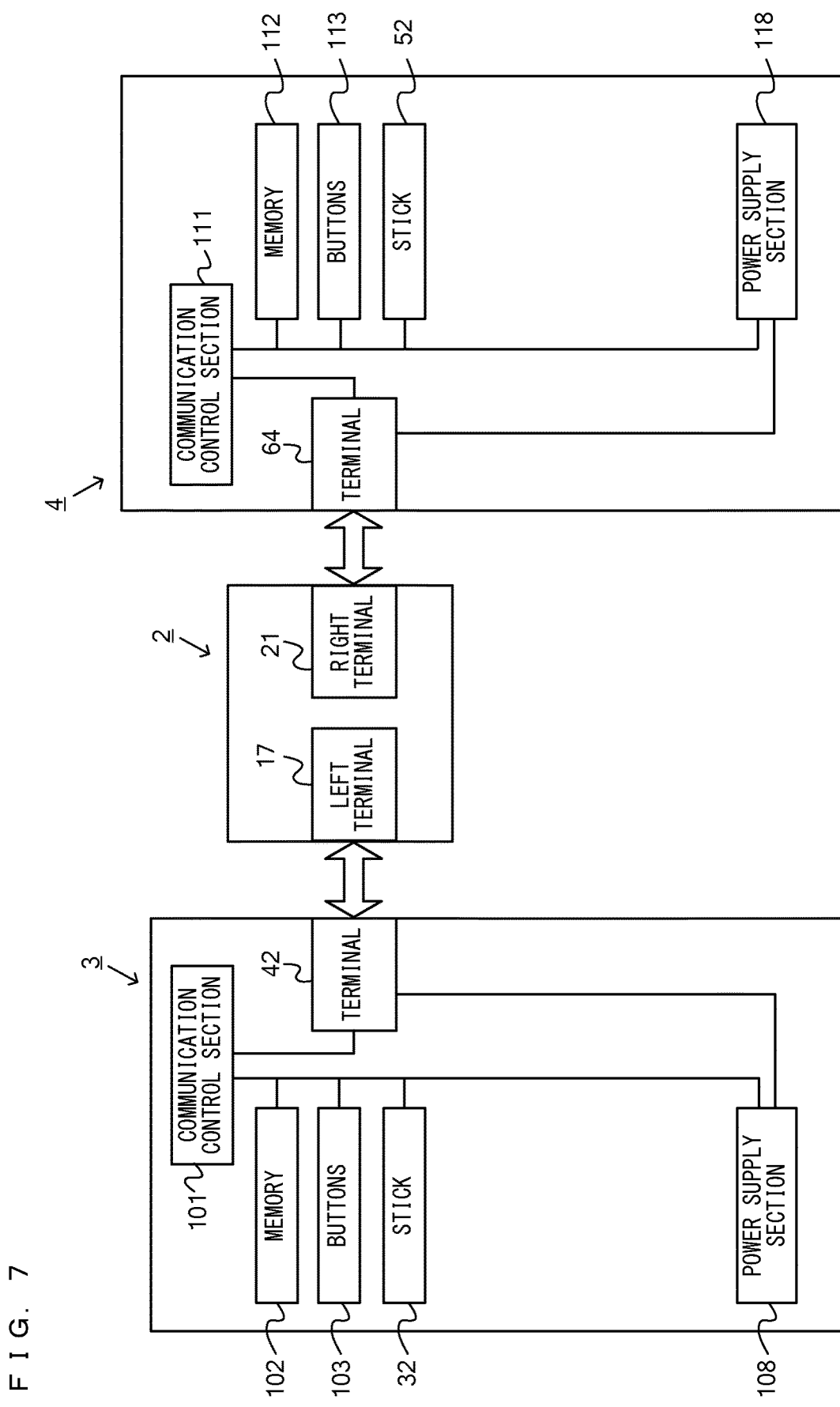
FIG. 7 is a block diagram showing non-limiting examples of the internal configurations of the main body apparatus 2 and the left controller 3 and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

Figure 8:
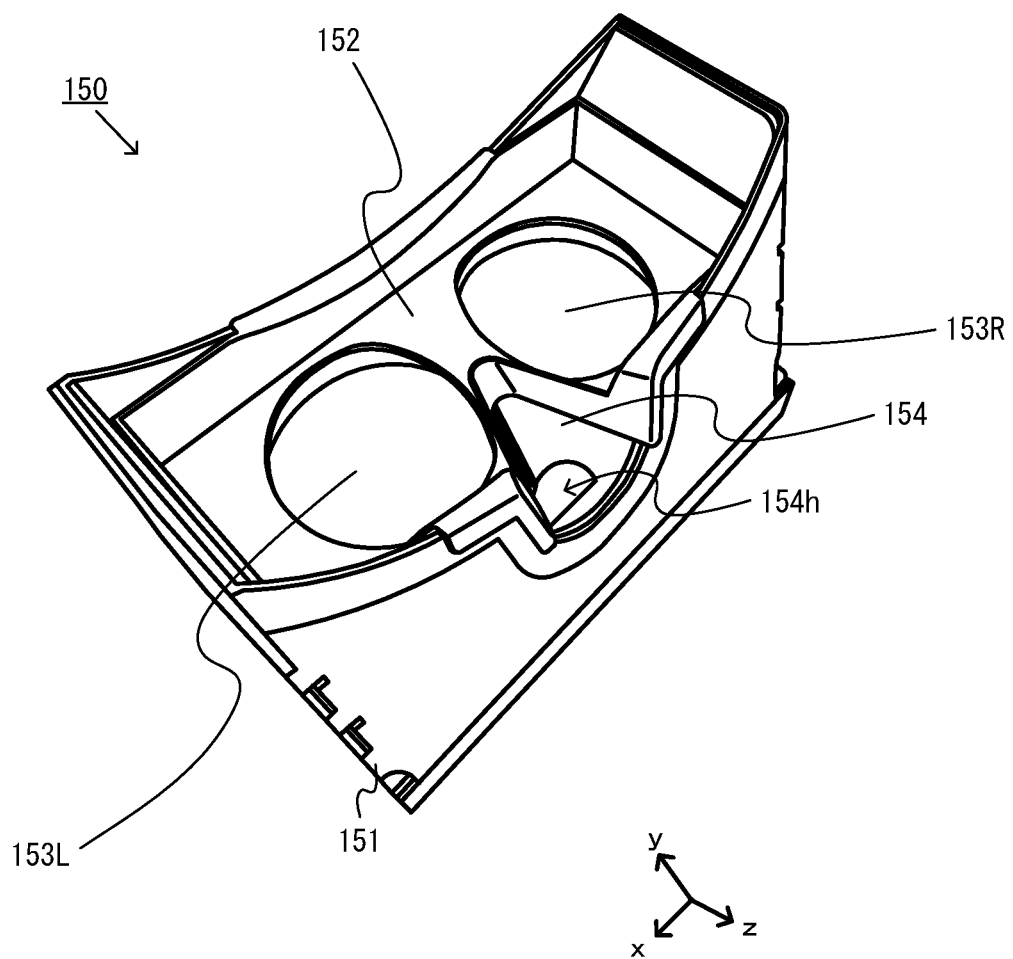
FIG. 8 is a perspective view showing a non-limiting example of the external appearance of a goggle apparatus 150.
Figure 9:
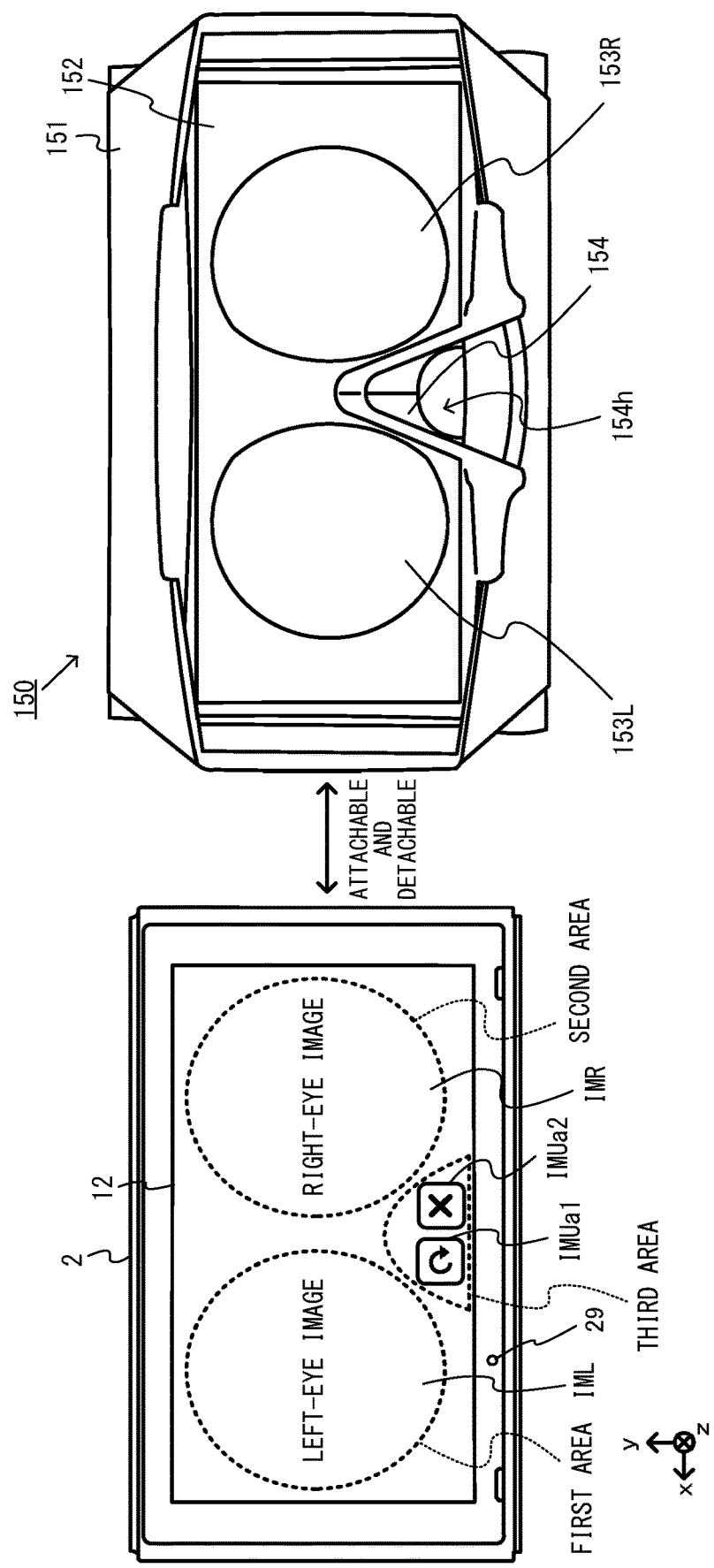
FIG. 9 is a front view showing a non-limiting example of the state where the main body apparatus 2 is attached to the goggle apparatus 150.
Figure 10:
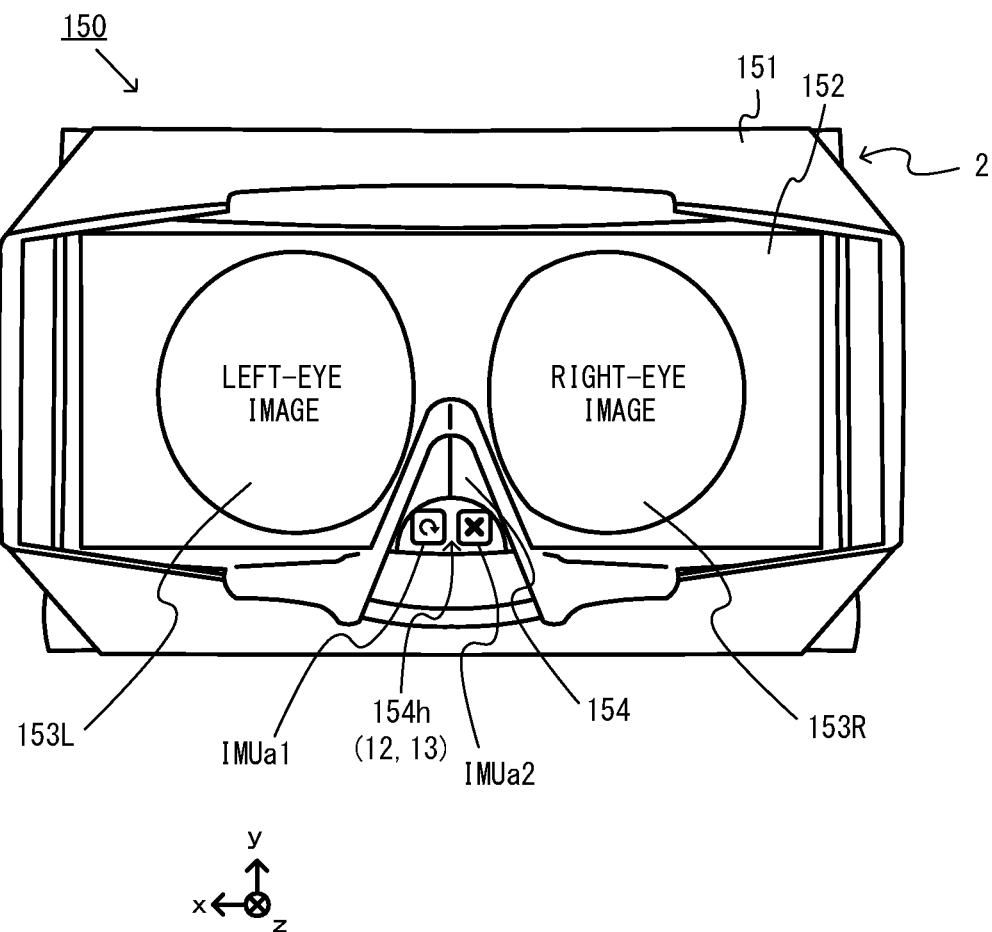
FIG. 10 is a front view showing a non-limiting example of the state of the main body apparatus 2 attached to the goggle apparatus 150.
Figure 11:
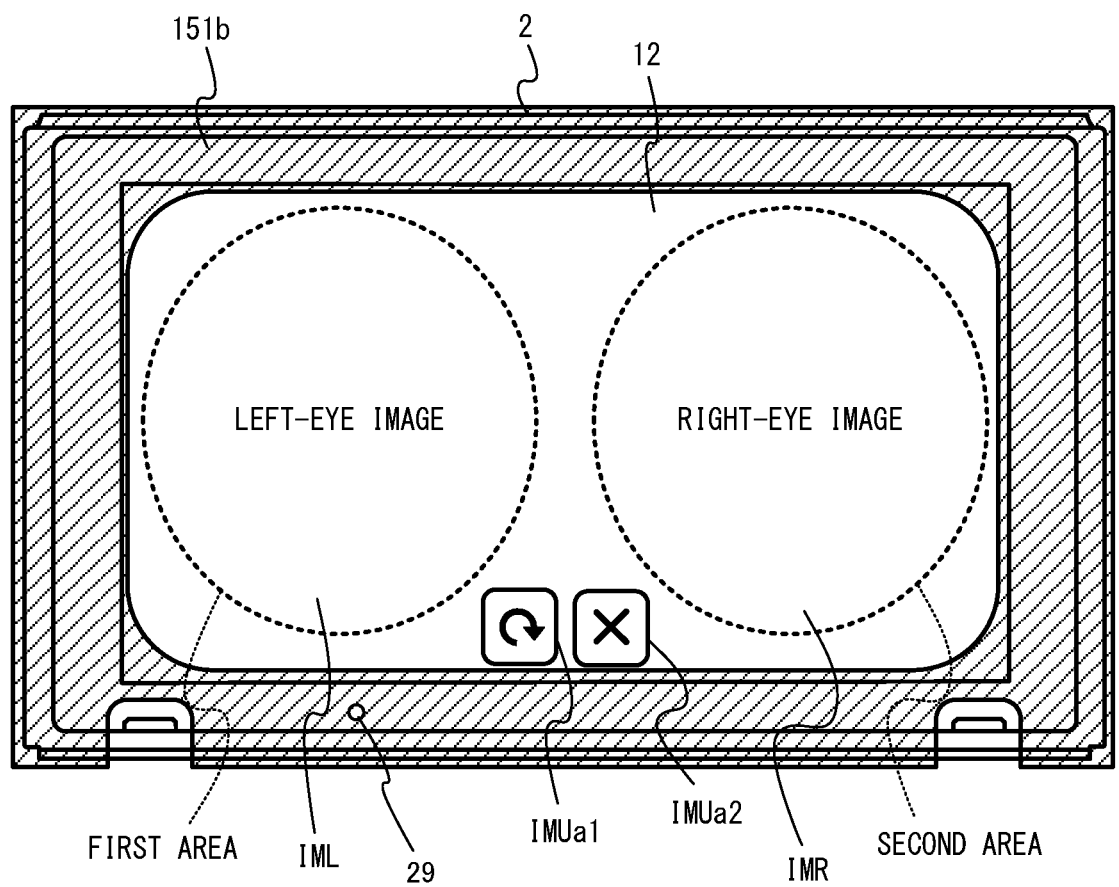
FIG. 11 is a diagram showing a non-limiting example of the shape of a front surface abutment portion 151*b* that is in surface contact with a part of a front surface of the main body apparatus 2.
Figure 14:
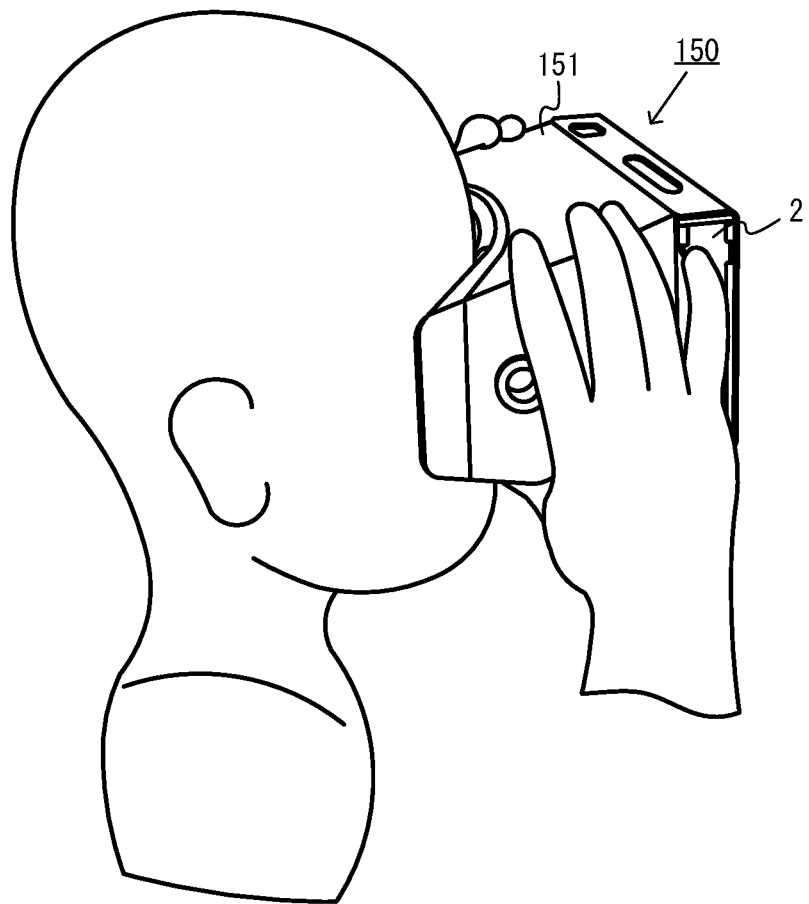
FIG. 14 is a diagram showing a non-limiting example of the state of a user viewing an image displayed by an image display system.
Figure 15:
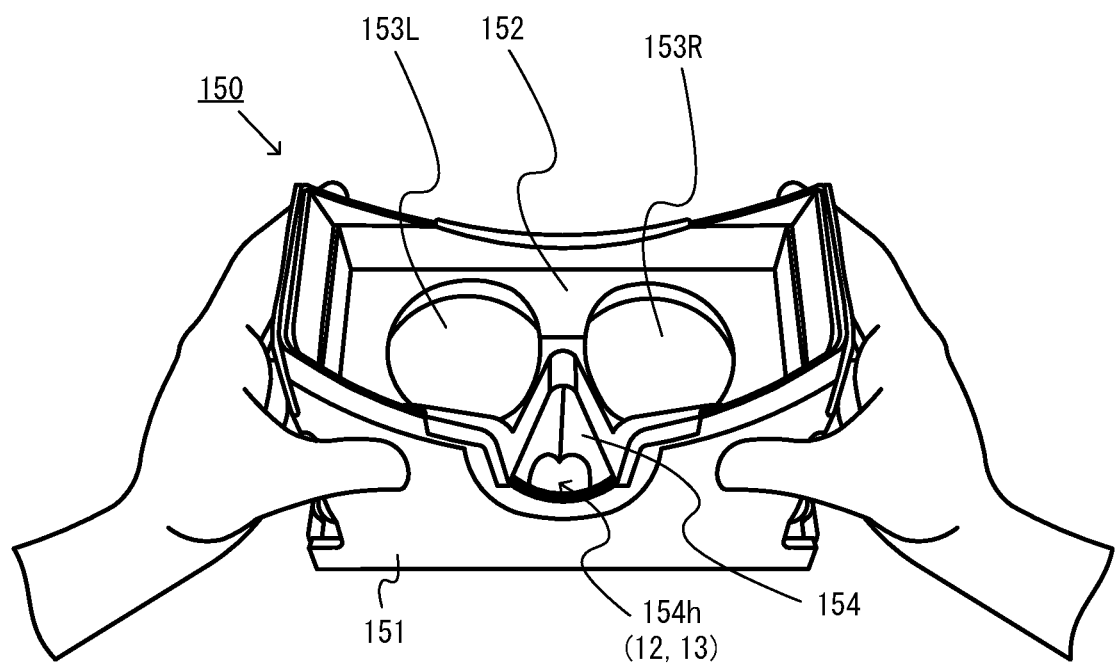
FIG. 15 is a diagram showing a non-limiting example of the state of the user holding the image display system.

Next, with reference to FIGS. 8 to 15, a description is given of the goggle apparatus 150, which is an example of an apparatus forming the image display system by attaching the game system 1 (specifically, the main body apparatus 2) to the apparatus. It should be noted that FIG. 8 is a perspective view showing an example of the external appearance of the goggle apparatus 150. FIG. 9 is a front view showing an example of the state where the main body apparatus 2 is attached to the goggle apparatus 150. FIG. 10 is a front view showing an example of the state of the main body apparatus 2 attached to the goggle apparatus 150. FIG. 11 is a diagram showing an example of the shape of a front surface abutment portion 151b that is in surface contact with a part of a front surface of the main body apparatus 2. FIG. 12 is a diagram showing an example of the internal structure of the goggle apparatus 150. FIG. 13 is a side view showing an example of the state of the main body apparatus 2 attached to the goggle apparatus 150. FIG. 14 is a diagram showing an example of the state of a user viewing an image displayed by the image display system. FIG. 15 is a diagram showing an example of the state of the user holding the image display system. It should be noted that FIG. 11 is a diagram viewed from the same direction as in FIG. 10 in the state (a transparent state) where a part of the goggle apparatus 150 (a part of a main body 151, a lens frame member 152, a lens 153, and a plate-like member 154) is removed to show the front surface abutment portion 151b in an easily understandable manner.

In FIGS. 8 to 13, the goggle apparatus 150 includes a main body 151, a lens frame member 152, a lens 153, and a plate-like member 154. Here, the goggle apparatus, which is an example of the apparatus included in the image display system, is not limited to a configuration described below so long as the goggle apparatus is worn fitted to the face of the user by covering the left and right eyes of the user, and has the function of blocking at least a part of external light and the function of supporting a stereoscopic view for the user with a pair of lenses. For example, the types of the goggle apparatus may include those used in various states, such as a goggle apparatus that is fitted to the face of the user by the user holding the goggle apparatus, a goggle apparatus that is fitted to the face of the user by fixing the goggle apparatus to the head of the user, and a goggle apparatus into which the user looks in the state where the goggle apparatus is placed. Further, the goggle apparatus may function as a so-called head-mounted display by being worn on the head of the user in the state where the main body apparatus 2 is attached to the goggle apparatus, or may have a helmet-like shape as well as the goggle-like shape. In the following description of the goggle apparatus 150, a goggle-type goggle apparatus that is worn by the user while fitted to the face of the user by the user holding the goggle apparatus is used.

The main body 151 includes an attachment portion to which the main body apparatus 2 is detachably fixed by the attachment portion being in contact with a front surface, a back surface, an upper surface, and a lower surface of the main body apparatus 2. The attachment portion includes a front surface abutment portion that is in surface contact with a part of the front surface (the surface on which the display 12 is provided) of the main body apparatus 2, a back surface abutment portion that is in surface contact with the back surface of the main body apparatus 2, an upper surface abutment portion that is in surface contact with the upper surface of the main body apparatus 2, and a lower surface abutment portion that is in surface contact with the lower surface of the main body apparatus 2. The attachment portion is formed into an angular tube which includes a gap formed by being surrounded by the front surface abutment portion, the back surface abutment portion, the upper surface abutment portion, and the lower surface abutment portion, and of which both left and right side surfaces are opened. Both side surfaces of the attachment portion (a side surface further in a positive x-axis direction shown in FIG. 8, and a side surface further in a negative x-axis direction shown in FIG. 8) open so that the attachment portion is attachable from the left side surface side or the right side surface side of the main body apparatus 2. Then, as shown in FIG. 9, when the main body apparatus 2 is attached to the goggle apparatus 150 from the opening on the right side surface side of the main body apparatus 2, the front surface abutment portion is in contact with the front surface of the main body apparatus 2, the back surface abutment portion is in contact with the back surface of the main body apparatus 2, the upper surface abutment portion is in contact with the upper surface of the main body apparatus 2, and the lower surface abutment portion is in contact with the lower surface of the main body apparatus 2. It should be noted that as shown in FIG. 11, in a front surface abutment portion 151b of the main body 151, an opening portion is formed so as not to hinder at least the field of view for display images (a left-eye image and a right-eye image) on the display 12 when the main body apparatus 2 is attached.

As shown in FIGS. 9 and 13, the main body apparatus 2 is attached to the goggle apparatus 150 by inserting the main body apparatus 2 in a sliding manner into the gap of the attachment portion of the main body 151 from the left side surface side or the right side surface side of the main body apparatus 2 along the front surface abutment portion, the back surface abutment portion, the upper surface abutment portion, and the lower surface abutment portion of the attachment portion. Further, the main body apparatus 2 can be detached from the goggle apparatus 150 by sliding the main body apparatus 2 to the left or the right along the front surface abutment portion, the back surface abutment portion, the upper surface abutment portion, and the lower surface abutment portion of the attachment portion from the state where the main body apparatus 2 is attached to the goggle apparatus 150. As described above, the main body apparatus 2 can be detachably attached to the goggle apparatus 150.

The lens frame member 152 is fixedly provided on the opening portion side formed in a front surface portion of the main body 151. The lens frame member 152 includes a pair of lens frames opened so as not to hinder the field of view for display images (a left-eye image IML and a right-eye image IMR) displayed on the display 12 of the main body apparatus 2 attached to the main body 151. Further, on outer edges formed in upper, lower, left, and right portions of the lens frame member 152, joint surfaces to be joined to the main body apparatus 2 are formed, and in a central portion of the outer edge formed in the lower portion, a V-shaped recessed portion for coming into contact with the nose of the user wearing the goggle apparatus 150 is formed.

The lens 153 includes a pair of a left-eye lens 153L and a right-eye lens 153R, and for example, is a pair of Fresnel lenses. The left-eye lens 153L and the right-eye lens 153R are fitted into the lens frames of the lens frame member 152. Specifically, the left-eye lens 153L is fitted into one of the lens frames opened so as not to hinder the field of view for the left-eye image IML displayed on the display 12 of the main body apparatus 2 attached to the main body 151. When the user looks into the left-eye lens 153L with their left eye, the user can view the left-eye image IML. Further, the right-eye lens 153R is fitted into the other lens frame opened so as not to hinder the field of view for the right-eye image IMR displayed on the display 12 of the main body apparatus 2 attached to the main body 151. When the user looks into the right-eye lens 153R with their right eye, the user can view the right-eye image IMR. It should be noted that typically, the left-eye lens 153L and the right-eye lens 153R may be circular or elliptical magnifying lenses, and may be lenses that distort images and cause the user to visually confirm the images. For example, the left-eye lens 153L may distort the left-eye image IML (described below) displayed distorted into a circular or elliptical shape, in a direction opposite to the distortion of the image and cause the user to visually confirm the image, and the right-eye lens 153R may distort the right-eye image IMR (described below) displayed distorted into a circular or elliptical shape, in a direction opposite to the distortion of the image and cause the user to visually confirm the image, whereby the user may stereoscopically view the images. Further, a configuration may be employed in which the left-eye lens 153L and the right-eye lens 153R are integrally formed.

The main body 151 includes the abutment portion provided protruding from the front surface side of the main body 151 to outside by surrounding the outer edges of the lens frame member 152 in an angular tube shape. In the abutment portion, an end surface protruding from the front surface side to outside is disposed on the near side of the lens 153 when the lens 153 is viewed from outside the goggle apparatus 150. The end surface is placed furthest on the near side (furthest in a negative z-axis direction) of the goggle apparatus 150 in the state where the main body apparatus 2 is attached. Then, the end surface of the abutment portion of the main body 151 has a shape that fits the face of the user (typically, the periphery of both eyes of the user) when the user looks into the goggle apparatus 150 to which the main body apparatus 2 is attached. The end surface has the function of fixing the positional relationships between the eyes of the user and the lens 153 by abutting the face of the user.

Further, when the user views a three-dimensional image displayed on the display 12 using the image display system, the abutment portion can block external light on the left-eye lens 153L and the right-eye lens 153R. This can improve a sense of immersion for the user viewing the three-dimensional image displayed on the display 12. It should be noted that when blocking light, the abutment portion does not need to completely block external light. For example, as shown in FIG. 15, in a part of the abutment portion formed into a tubular shape, a recess may be formed. It should be noted that the recess of the abutment portion exemplified in FIG. 15 is formed at the position of a lower portion of the midpoint between the left-eye lens 153L and the right-eye lens 153R. This is a position that the nose of the user viewing the three-dimensional image displayed on the display 12 abuts. That is, the recess of the abutment portion can avoid the strong abutment between the abutment portion and the nose of the user. Even if the light blocking effect somewhat deteriorates, a feeling of discomfort regarding the abutment between the abutment portion and the nose can be reduced.

As shown in FIG. 10, the plate-like member 154 is fixedly provided within the main body 151, which is a portion between the lens frame member 152 and the display 12 when the main body apparatus 2 is attached to the attachment portion of the main body 151. For example, a part of the plate-like member 154 has a shape along the V-shaped recessed portion of the lens frame member 152 and is placed as a wall (hereinafter referred to as a "first wall portion") connecting between the recessed portion and the display 12 of the main body apparatus 2 attached to the main body 151. Then, a space surrounded by the first wall portion is an opening portion 154h that exposes a part of the display 12 of the main body apparatus 2 attached to the main body 151 to outside and functions as an operation window that enables the user to perform a touch operation on the part through the space. It should be noted that a part of the first wall portion of the plate-like member 154 may open as shown in FIG. 12.

Further, as shown in FIG. 12, as an example, the plate-like member 154 is provided standing in a vertical direction between the left-eye lens 153L and the right-eye lens 153R and placed as a wall (hereinafter referred to as a "second wall portion") connecting between the recessed portion and the display 12 of the main body apparatus 2 attached to the main body 151. Then, the second wall portion is disposed between the left-eye image IML and the right-eye image IMR displayed on the display 12, so as to divide the images in the state where the main body apparatus 2 is attached to the main body 151. The second wall portion functions as a division wall provided between the left-eye image IML and the right-eye image IMR. Then, the plate-like member 154 is provided by extending the first wall portion to the second wall portion, and the first wall portion and the second wall portion are formed of integrated members.

In FIGS. 10, 13, 14, and 15, the image display system is formed by attaching the main body apparatus 2 to the goggle apparatus 150. Here, in the exemplary embodiment, the main body apparatus 2 is attached such that the entirety of the main body apparatus 2 is covered by the goggle apparatus 150. Then, when the main body apparatus 2 is attached to the goggle apparatus 150, the user can view only the left-eye image IML displayed in a left area of the display 12 through the left-eye lens 153L and can view only the right-eye image IMR displayed in a right area of the display 12 through the right-eye lens 153R. Thus, by viewing the left-eye lens 153L with their left eye and viewing the right-eye lens 153R with their right eye, the user of the image display system can visually confirm the left-eye image IML and the right-eye image IMR. Thus, by displaying the left-eye image IML and the right-eye image IMR having parallax with each other on the display 12, it is possible to display a three-dimensional image having a stereoscopic effect to the user.

As shown in FIGS. 14 and 15, when the user views the three-dimensional image displayed on the display 12 while holding the image display system obtained by attaching the main body apparatus 2 to the goggle apparatus 150, the user can hold with their left hand a left side portion of the goggle apparatus 150 to which the main body apparatus 2 is attached, and can hold a right side portion of the goggle apparatus 150 with their right hand. The user thus holds the left and right side portions of the goggle apparatus 150, whereby it is possible to maintain the state where the main body apparatus 2 is stably attached.

Further, in the image display system, even in the state where the main body apparatus 2 is attached to the goggle apparatus 150, a touch operation can be performed on a part of the touch panel 13 provided on the screen of the display 12, through the opening portion 154h formed surrounded by the first wall portion of the plate-like member 154 (a third area of the display 12 described below). Further, based on the detection results of the acceleration sensor 89 and/or the angular velocity sensor 90 provided in the main body apparatus 2, the image display system can calculate information regarding the motion and/or the orientation of the main body apparatus 2, i.e., the motion and/or the orientation of the image display system including the goggle apparatus 150. Thus, the image display system can calculate the orientation based on the direction of gravity of the head of the user looking into the goggle apparatus 150 to which the main body apparatus 2 is attached. Further, when the orientation or the direction of the head of the user looking into the goggle apparatus 150 to which the main body apparatus 2 is attached changes, the image display system can calculate the direction or the angle of the change. Further, when the user looking into the goggle apparatus 150 to which the main body apparatus 2 is attached vibrates the image display system by hitting the image display system, the image display system can detect the vibration. Thus, when the user views the three-dimensional image displayed on the display 12 through the left-eye lens 153L and the right-eye lens 153R in the state the main body apparatus 2 is attached to the goggle apparatus 150, a play style is achieved in which a touch operation through the opening portion 154h, an operation based on the orientation based on the direction of gravity of the image display system, the operation of changing the orientation of the image display system, and the operation of vibrating the image display system can be performed.

It should be noted that when the image display system according to the exemplary embodiment is used, an operation may be performed using at least one of the left controller 3 and the right controller 4 detached from the main body apparatus 2. For example, when the image display system is operated using the left controller 3, the user views the three-dimensional image displayed on the display 12, while holding the goggle apparatus 150 to which the main body apparatus 2 is attached with their right hand, and also performs the operation while holding the detached left controller 3 alone with their left hand. In this case, operation information regarding the operations performed on the left controller 3 and/or the right controller 4 detached from the main body apparatus 2 is transmitted to the main body apparatus 2 through wireless communication with the main body apparatus 2. Specifically, the operation information regarding the operation performed on the left controller 3 is wirelessly transmitted from the communication control section 101 of the left controller 3 and received by the controller communication section 83 of the main body apparatus 2. Further, the operation information regarding the operation performed on the right controller 4 is wirelessly transmitted from the communication control section 111 of the right controller 4 and received by the controller communication section 83 of the main body apparatus 2.

As described above, in the exemplary embodiment, a portable image display system where the user views a three-dimensional image while holding the portable image display system can be formed by attaching the main body apparatus 2 to the goggle apparatus 150. Further, in the image display system according to the exemplary embodiment, the user views the three-dimensional image displayed on the display 12 of the main body apparatus 2, while causing the face of the user to abut the goggle apparatus 150. Thus, the positional relationships between stereo speakers (the left speaker 88L and the right speaker 88R) provided in the main body apparatus 2 and the ears of the user are also fixed, and the left and right speakers are placed near the ears of the users. Thus, the main body apparatus 2 can output sounds based on the positional relationships between a sound output apparatus and the ears of a viewer without forcing the viewer to use earphones or speakers. For example, the main body apparatus 2 can control a sound source using so-called 3D audio effect technology based on the positional relationships between the sound output apparatus and the ears of the viewer.

Next, with reference to FIGS. 9, 10, and 16, a description is given of images displayed on the main body apparatus 2. It should be noted that FIG. 16 is a diagram showing examples of images displayed on the main body apparatus 2 in a stereoscopic display mode and a non-stereoscopic display mode.

The image display system according to the exemplary embodiment is set to either of a stereoscopic display mode used to stereoscopically view an image displayed on the display 12 by attaching the main body apparatus 2 to the goggle apparatus 150, and a non-stereoscopic display mode used to directly view an image displayed on the display 12 by detaching the main body apparatus 2 from the goggle apparatus 150, thereby non-stereoscopically viewing the image. Then, the image display system displays the image corresponding to the set mode on the display 12 of the main body apparatus 2. Here, the stereoscopic image to be stereoscopically viewed may be stereoscopically viewed by the user viewing a right-eye image and a left-eye image having parallax with each other with their right eye and left eye. In this case, the non-stereoscopic image to be non-stereoscopically viewed is an image other than that of the above two-image display (stereoscopic display), and typically, may be viewed by the user viewing a single image with their right eye and left eye. It should be noted that in the exemplary embodiment, the non-stereoscopic display mode is used as an example of a first display mode. Further, in the exemplary embodiment, the stereoscopic display mode is used as an example of a second display mode.

In the stereoscopic display mode, the image display system forms a content image as a display target (e.g., an image for displaying a part of a virtual space or real space) using the left-eye image IML and the right-eye image IMR having parallax with each other, displays the left-eye image IML in the left area of the display 12, and displays the right-eye image IML in the right area of the display 12. Specifically, as shown in FIG. 9, in the stereoscopic display mode, the left-eye image IML is displayed in a first area, which is an approximately elliptical area that can be viewed through the left-eye lens 153L when the main body apparatus 2 is attached to the goggle apparatus 150, and is also a part of the left area of the display 12. Further, in the stereoscopic display mode, the right-eye image IMR is displayed in a second area, which is an approximately elliptical area that can be viewed through the right-eye lens 153R when the main body apparatus 2 is attached to the goggle apparatus 150, and is also a part of the right area of the display 12.

Here, as described above, in the state where the main body apparatus 2 is attached to the goggle apparatus 150, the second wall portion of the plate-like member 154 is placed between the left-eye image IML displayed in the first area of the display 12 and the right-eye image IMR displayed in the second area of the display 12. Thus, the left-eye image IML and the right-eye image IMR are divided by the second wall portion of the plate-like member 154 as a division wall. Thus, it is possible to prevent the right-eye image IMR from being visually confirmed through the left-eye lens 153L, or the left-eye image IML from being visually confirmed through the right-eye lens 153R.

As an example, images of the virtual space viewed from a pair of virtual cameras (a left virtual camera and a right virtual camera) having parallax with each other and placed in the virtual space are generated as the left-eye image IML and the right-eye image IMR. The pair of virtual cameras is placed in the virtual space, corresponding to the orientation of the main body apparatus 2 based on the direction of gravity in real space. Then, the pair of virtual cameras changes its orientation in the virtual space, corresponding to a change in the orientation of the main body apparatus 2 in real space and controls the direction of the line of sight of the virtual cameras in accordance with the orientation of the main body apparatus 2. Consequently, by the operation of changing the orientation of the main body apparatus 2 (the image display system) to look around, the user wearing the image display system can change the display range of the virtual space to be stereoscopically viewed, can look over the virtual space that is stereoscopically viewed, and therefore can have an experience as if actually being at the location of the virtual cameras. It should be noted that in the exemplary embodiment, the main body apparatus 2 matches the direction of a gravitational acceleration acting on the main body apparatus 2 and the direction of gravity in the virtual space acting on the virtual cameras and also matches the amount of change in the orientation of the main body apparatus 2 and the amount of change in the direction of the line of sight of the virtual cameras. This increases the reality of the operation of looking over the virtual space to be stereoscopically viewed based on the orientation of the main body apparatus 2.

Further, the image display system displays on the display 12a user interface image IMU for receiving a touch operation on the touch panel 13 of the main body apparatus 2. For example, a user interface image IMUa displayed in the stereoscopic display mode is displayed in the display area of the display 12 where a touch operation can be performed through the opening portion 154h of the goggle apparatus 150. For example, as described above, the opening portion 154h is formed surrounded by the first wall portion of the plate-like member 154 and enables a touch operation on a part of the display 12 of the main body apparatus 2 attached to the goggle apparatus 150 (specifically, an area near the center of the lower portion of the display 12) through the V-shaped recessed portion of the lens frame member 152 that abuts the nose of the user. As an example, as shown in FIG. 9, even in the state where the main body apparatus 2 is attached to the goggle apparatus 150, the opening portion 154h enables a touch operation on a third area set in the lower portion of the display 12 sandwiched between the first area and the second area of the display 12.

For example, in the stereoscopic display mode, two user interface images IMUa1 and IMUa2 are displayed in the third area of the display 12. As an example, the user interface image IMUa1 is an operation icon for, when its display position is subjected to a touch operation through the touch panel 13, giving an operation instruction to retry a game from the beginning. Further, the user interface image IMUa2 is an operation icon for, when its display position is subjected to a touch operation through the touch panel 13, giving an operation instruction to end the game. Then, the two user interface images IMUa1 and IMUa2 are displayed next to each other in the third area of the display 12, in sizes matching the shape of the third area. Consequently, the user can give a plurality of operation instructions based on touch operations by performing a touch operation on either of the two user interface images IMUa1 and IMUa2 through the opening portion 154h even in the state where the main body apparatus 2 is attached to the goggle apparatus 150. It should be noted that the two user interface images IMUa1 and IMUa2 may be displayed near the third area that enables a touch operation by exposing a part of the display 12 to outside. That is, parts of the two user interface images IMUa1 and/or IMUa2 may be displayed outside the third area. It should be noted that in the exemplary embodiment, the user interface image IMUa is used as an example of a second user interface image.

The two user interface images IMUa1 and IMUa2 are images displayed in the stereoscopic display mode and are displayed in the third area outside the first area that can be viewed with the left eye of the user and the second area that can be viewed with the right eye of the user in the display 12 of the main body apparatus 2 attached to the goggle apparatus 150. That is, the user interface images IMUa1 and IMUa2 displayed in the third area are displayed outside the field of view of the user visually confirming the user interface images IMUa1 and IMUa2 through the goggle apparatus 150, do not include two images having parallax with each other, and therefore are displayed as non-stereoscopic images that cannot be stereoscopically viewed. Further, the user interface images IMUa1 and IMUa2 as targets of touch operations are displayed outside the first area and the second area for displaying a stereoscopic image, and therefore, the first area and the second area are less likely to be subjected to a touch operation. Thus, it is possible to prevent the first area and the second area for displaying a stereoscopic image from being defaced by the display 12 being subjected to a touch operation, and also prevent a finger for performing a touch operation from entering the field of view in the state where the stereoscopic image is viewed.

It should be noted that in another exemplary embodiment, the user interface images IMUa1 and IMUa2 may be displayed on the display 12 as a stereoscopic image that can be stereoscopically viewed in the stereoscopic display mode. In this case, the user interface images IMUa1 and IMUa2 are displayed on the display 12 as a stereoscopic image by including two images having parallax with each other. Typically, one of images to be stereoscopically viewed is displayed in a part of the first area, and the other image to be stereoscopically viewed is displayed in a part of the second area.

As shown in FIG. 16, in the non-stereoscopic display mode, the image display system forms the above content image as the display target using a single image IMS as a non-stereoscopic image, and as an example, displays the single image IMS in the entirety of the display area of the display 12.

As an example, an image of the virtual space viewed from a single virtual camera placed in the virtual space is generated as the single image IMS. The single virtual camera is placed in the virtual space, corresponding to the orientation of the main body apparatus 2 based on the direction of gravity in real space. Then, the single virtual camera changes its orientation in the virtual space, corresponding to a change in the orientation of the main body apparatus 2 in real space and controls the direction of the line of sight of the virtual camera in accordance with the orientation of the main body apparatus 2. Consequently, by the operation of changing the orientation of the main body apparatus 2 to look around, the user holding the main body apparatus 2 detached from the goggle apparatus 150 can look over the virtual space by changing the display range of the virtual space displayed on the display 12, and therefore can have an experience as if actually being at the location of the virtual camera. It should be noted that in the exemplary embodiment, also in the non-stereoscopic display mode, the main body apparatus 2 matches the direction of a gravitational acceleration acting on the main body apparatus 2 and the direction of gravity in the virtual space acting on the virtual camera and also matches the amount of change in the orientation of the main body apparatus 2 and the amount of change in the direction of the line of sight of the virtual camera. This also increases the reality of the operation of looking over the virtual space to be non-stereoscopic viewed based on the orientation of the main body apparatus 2. It should be noted that in the exemplary embodiment, the single image IMS is used as an example of a non-stereoscopic image.

Further, a user interface image IMUb displayed in the non-stereoscopic display mode is displayed on the display 12 in a superimposed manner on, for example, the content image (the single image IMS) displayed on the display 12. For example, as shown in FIG. 16, also in the non-stereoscopic display mode, two user interface images IMUb1 and IMUb2 are displayed on the display 12. As an example, the user interface image IMUb1 is an image corresponding to the user interface image IMUa1 and is an operation icon for, when its display position is subjected to a touch operation through the touch panel 13, giving an operation instruction to retry a game from the beginning. Further, the user interface image IMUb2 is an image corresponding to the user interface image IMUa2 and is an operation icon for, when its display position is subjected to a touch operation through the touch panel 13, giving an operation instruction to end the game. Here, the image corresponding to the user interface image IMUa indicates that the design and/or the size of the image are different from those of the user interface image IMUa, but the function of the image is substantially the same (e.g., the content of an operation instruction given by performing a touch operation on the image is the same) as that of the user interface image IMUa. It should be noted that the image corresponding to the user interface image IMUa may not only have substantially the same function as that of the user interface image IMUa displayed in the non-stereoscopic display mode, but also have the same design and size as those of the user interface image IMUa, i.e., the image may be completely the same as the user interface image IMUa. It should be noted that in the exemplary embodiment, the user interface image IMUb is used as an example of a first user interface image.

The two user interface images IMUb1 and IMUb2 are displayed in corner areas (e.g., an upper left corner area and an upper right corner area) of the display 12 that are different from the third area. It should be noted that areas where touch operations can be performed on the two user interface images IMUb1 and IMUb2 are not limited, and therefore, the two user interface images IMUb1 and IMUb2 can be displayed larger than the user interface image IMUa displayed in the stereoscopic display mode and can be displayed in sizes and shapes that facilitate a touch operation of the user and at positions where the visibility of the content image (the single image IMS) is unlikely to be impaired by a touch operation.

Based on the result of detecting whether or not the main body apparatus 2 is in an attached state where the main body apparatus 2 is attached to the goggle apparatus 150, or whether or not the main body apparatus 2 is in a halfway attached state where the main body apparatus 2 is being attached to the goggle apparatus 150, the image display system according to the exemplary embodiment can automatically switch the stereoscopic display mode and the non-stereoscopic display mode. For example, in the main body apparatus 2, the illuminance sensor 29 is provided that detects the illuminance (brightness) of light incident on the main surface side of the housing 11. Based on the detection result of the illuminance by the illuminance sensor 29, the main body apparatus 2 can detect whether or not the main body apparatus 2 is in the attached state where the main body apparatus 2 is attached to the goggle apparatus 150, or whether or not the main body apparatus 2 is in the halfway attached state where the main body apparatus 2 is being attached to the goggle apparatus 150. Specifically, when the main body apparatus 2 is attached to the goggle apparatus 150, or when the main body apparatus 2 is in the halfway attached state, the illuminance detected by the illuminance sensor 29 decreases. Thus, a threshold allowing the detection of the decreased illuminance is provided, and it is detected whether or not the illuminance is greater than or equal to the threshold. Thus, it is possible to detect whether or not the main body apparatus 2 is in the attached state, or whether or not the main body apparatus 2 is in the halfway attached state. Here, "the fact that the main body apparatus 2 is in the attached state" detected by the main body apparatus 2 based on the detection result of the illuminance by the illuminance sensor 29 is the fact that the main body apparatus 2 is in the state where the main body apparatus 2 is completely attached to the goggle apparatus 150. Further, "the fact that the main body apparatus 2 is in the halfway attached state" detected by the main body apparatus 2 based on the detection result of the illuminance by the illuminance sensor 29 is the fact that the main body apparatus 2 is in the state where the main body apparatus 2 is at a stage prior to the state where the main body apparatus 2 is completely attached to the goggle apparatus 150.

When the illuminance sensor 29 detects whether or not the main body apparatus 2 is in the attached state, or whether or not the main body apparatus 2 is in the halfway attached state, a plurality of forms are possible. As a first example, as shown in FIG. 11, in the attachment portion of the goggle apparatus 150 for detachably fixing the main body apparatus 2, when the front surface abutment portion 151b of the main body 151 in surface contact with a part of the front surface (the surface on which the display 12 is provided) of the main body apparatus 2 in the attached state is formed by covering a light-receiving surface or a light-receiving hole of the illuminance sensor 29, the front surface abutment portion 151b enters the state where the front surface abutment portion 151b covers the light-receiving surface or the light-receiving hole of the illuminance sensor 29, whereby it is detected whether or not the main body apparatus 2 is in the attached state where the main body apparatus 2 is attached to the goggle apparatus 150, or whether or not the main body apparatus 2 is in the halfway attached state where the main body apparatus 2 is being attached to the goggle apparatus 150. As an example, when the light-receiving surface or the light-receiving hole of the illuminance sensor 29 is provided in a corner portion of the main body apparatus 2, and if the main body apparatus 2 is inserted into the attachment portion of the goggle apparatus 150 from the corner portion side, the light-receiving surface or the light-receiving hole enters the state where the light-receiving surface or the light-receiving hole is covered by the front surface abutment portion 151b in an early period of this attachment operation. Thus, based on the detection result of the illuminance by the illuminance sensor 29, it is possible to detect that the main body apparatus 2 "is in the halfway attached state". Further, if the main body apparatus 2 is inserted into the attachment portion of the goggle apparatus 150 from the side surface side opposite to the corner portion where the light-receiving surface or the light-receiving hole of the illuminance sensor 29 is provided, the light-receiving surface or the light-receiving hole enters the state where the light-receiving surface or the light-receiving hole is covered by the front surface abutment portion 151b in a terminal period of this attachment operation. Thus, based on the detection result of the illuminance by the illuminance sensor 29, it is possible to detect that the main body apparatus 2 "is in the attached state". As another example, when the light-receiving surface or the light-receiving hole of the illuminance sensor 29 is provided on the center side of the lower portion of the main body apparatus 2, and if the main body apparatus 2 is inserted into the attachment portion of the goggle apparatus 150, the light-receiving surface or the light-receiving hole enters the state where the light-receiving surface or the light-receiving hole is covered by the front surface abutment portion 151b from an early period to an intermediate period of this attachment operation, no matter which direction the main body apparatus 2 is inserted from. Thus, based on the detection result of the illuminance by the illuminance sensor 29, it is possible to detect that the main body apparatus 2 "is in the halfway attached state". It should be noted that in the first example, the front surface abutment portion 151b of the main body 151 is used as an example of a light-shielding portion.

As a second example, even when the front surface abutment portion 151b is not formed by covering the light-receiving surface or the light-receiving hole of the illuminance sensor 29, using the fact that the inside of the main body 151 is relatively dark, it is detected whether or not the main body apparatus 2 is in the attached state where the main body apparatus 2 is attached to the goggle apparatus 150, or whether or not the main body apparatus 2 is in the halfway attached state where the main body apparatus 2 is being attached to the goggle apparatus 150. For example, the state where external light is incident on the inside of the main body 151 of the goggle apparatus 150 through the left-eye lens 153L and the right-eye lens 153R is possible. Even in this state, the attached state of the main body apparatus 2 is detected by detecting that the illuminance is greater than that outside the main body 151. As an example, when the light-receiving surface or the light-receiving hole of the illuminance sensor 29 is provided in a corner portion of the main body apparatus 2, and if the main body apparatus 2 is inserted into the attachment portion of the goggle apparatus 150 from the corner portion side, the light-receiving surface or the light-receiving hole is inserted into the main body 151 in an early period of this attachment operation. Thus, based on the detection result of the illuminance by the illuminance sensor 29, it is possible to detect that the main body apparatus 2 "is in the halfway attached state". Further, if the main body apparatus 2 is inserted into the attachment portion of the goggle apparatus 150 from the side surface side opposite to the corner portion where the light-receiving surface or the light-receiving hole of the illuminance sensor 29 is provided, the light-receiving surface or the light-receiving hole is inserted into the main body 150 in a terminal period of this attachment operation. Thus, based on the detection result of the illuminance by the illuminance sensor 29, it is possible to detect that the main body apparatus 2 "is in the attached state". As another example, when the light-receiving surface or the light-receiving hole of the illuminance sensor 29 is provided on the center side of the lower portion of the main body apparatus 2, and if the main body apparatus 2 is inserted into the attachment portion of the goggle apparatus 150, the light-receiving surface or the light-receiving hole is inserted into the main body 151 from an early period to an intermediate period of this attachment operation, no matter which direction the main body apparatus 2 is inserted from. Thus, based on the detection result of the illuminance by the illuminance sensor 29, it is possible to detect that the main body apparatus 2 "is in the halfway attached state". It should be noted that in the second example, the main body 151 is used as another example of the light-shielding portion.

As a third example, even when the front surface abutment portion 151b is not formed by covering the light-receiving surface or the light-receiving hole of the illuminance sensor 29, using the fact that the inside of the main body 151 darkens by the user wearing the goggle apparatus 150 to which the main body apparatus 2 is attached, it is detected that the main body apparatus 2 is in the attached state where the main body apparatus 2 is attached to the goggle apparatus 150. For example, in the state where the user does not wear the goggle apparatus 150, it is possible that external light is incident on the main body 151 of the goggle apparatus 150 through the left-eye lens 153L and the right-eye lens 153R. In this case, the external light incident through the left-eye lens 153L and the right-eye lens 153R is blocked by the user wearing the goggle apparatus 150. Thus, the attached state of the main body apparatus 2 can be detected by detecting that the illuminance of the inside of the main body 151 decreases. As an example, when light incident on the light-receiving surface or the light-receiving hole of the illuminance sensor 29 placed in the main body 151 of the goggle apparatus 150 is blocked by the main body 151 and the face of the user, based on the detection result of the illuminance by the illuminance sensor 29, it is possible to detect that the main body apparatus 2 "is in the attached state". Further, in this example, it is possible to detect not only whether or not the main body apparatus 2 is in the attached state where the main body apparatus 2 is attached to the goggle apparatus 150, but also whether or not the user wears the goggle apparatus 150 to which the main body apparatus 2 is attached. It should be noted that in the third example, the main body 151 is used as another example of the light-shielding portion.

When it is determined that the main body apparatus 2 is not in the state where the main body apparatus 2 is attached to the goggle apparatus 150, the image display system according to the exemplary embodiment sets the display mode of the main body apparatus 2 to the non-stereoscopic display mode. On the other hand, in the main body apparatus 2 set to the non-stereoscopic display mode, when it is determined that the main body apparatus 2 changes from a non-attached state where the main body apparatus 2 is not attached to the goggle apparatus 150 to the attached state where the main body apparatus 2 is attached to the goggle apparatus 150, the main body apparatus 2 changes the content image of a displayed non-stereoscopic image to a stereoscopic image, thereby displaying the same content image on the display 12. As an example, when the single virtual camera is set in the virtual space to display the single image IMS in the non-stereoscopic display mode, and a virtual space image is generated, the main body apparatus 2 sets virtual cameras for displaying the left-eye image IML and the right-eye image IMR by changing the single virtual camera to the pair of virtual cameras (the left virtual camera and the right virtual camera) having parallax with each other, without changing the position and the direction of the line of sight of the single virtual camera, thereby switching to the generation of a virtual space image in the stereoscopic display mode. Further, in the main body apparatus 2 set to the stereoscopic display mode, when it is determined that the main body apparatus 2 changes from the attached state where the main body apparatus 2 is attached to the goggle apparatus 150 to the non-attached state where the main body apparatus 2 is not attached to the goggle apparatus 150, the main body apparatus 2 changes the content image of a displayed stereoscopic image to a non-stereoscopic image, thereby displaying the same content image corresponding to the content image of the stereoscopic image, as a non-stereoscopic image on the display 12. As an example, when the pair of virtual cameras is set in the virtual space to display the left-eye image IML and the right-eye image IMR in the stereoscopic display mode, and a virtual space image is generated, the main body apparatus 2 sets a virtual camera for displaying the single image IMS by changing the pair of virtual cameras to the single virtual camera without changing the position and the direction of the line of sight of the pair of virtual cameras, thereby switching to the generation of a virtual space image in the non-stereoscopic display mode. As described above, the content image of a non-stereoscopic image (e.g., a virtual space image) corresponding to the content image of a stereoscopic image (e.g., a virtual space image) or the content image of a stereoscopic image (e.g., a virtual space image) corresponding to the content image of a non-stereoscopic image (e.g., a virtual space image) indicates that there is only a difference between a stereoscopic image and a non-stereoscopic image in either case. However, the content image of a non-stereoscopic image corresponding to the content image of a stereoscopic image and the content image of a stereoscopic image corresponding to the content image of a non-stereoscopic image may be different in display range. Typically, the content image of a stereoscopic image may have a display range smaller than that of the content image of a non-stereoscopic image.

Further, when the display mode is switched, the image display system according to the exemplary embodiment changes the size, the shape, and the position of the user interface image IMU and displays the user interface image IMU on the display 12. For example, in the main body apparatus 2 set to the non-stereoscopic display mode, when it is determined that the main body apparatus 2 changes from the non-attached state where the main body apparatus 2 is not attached to the goggle apparatus 150 to the attached state where the main body apparatus 2 is attached to the goggle apparatus 150, the main body apparatus 2 changes the shapes of the user interface images IMUb1 and IMUb2 displayed in a superimposed manner on the content image in the corner areas of the display 12 to the user interface images IMUa1 and IMUa2 and also moves the display positions of the user interface images IMUa1 and IMUa2 to the third area of the display 12, thereby displaying the user interface image IMU having the same function. Further, in the main body apparatus 2 set to the stereoscopic display mode, when it is determined that the main body apparatus 2 changes from the attached state where the main body apparatus 2 is attached to the goggle apparatus 150 to the non-attached state where the main body apparatus 2 is not attached to the goggle apparatus 150, the main body apparatus 2 changes the shapes of the user interface images IMUa1 and IMUa2 displayed in the third area of the display 12 to the user interface images IMUb1 and IMUb2 and also moves the display positions of the user interface images IMUb1 and IMUb2 so that the user interface images IMUb1 and IMUb2 are displayed in a superimposed manner on the content image in the corner areas of the display 12, thereby displaying the user interface image IMU having the same function.

It should be noted that in the above exemplary embodiment, an example has been used where based on the detection result of the illuminance by the illuminance sensor 29, it is detected whether or not the main body apparatus 2 is in the attached state where the main body apparatus 2 is attached to the goggle apparatus 150, or whether or not the main body apparatus 2 is in the halfway attached state where the main body apparatus 2 is being attached to the goggle apparatus 150. Alternatively, based on another detection result, it may be detected whether or not the main body apparatus 2 is in the attached state where the main body apparatus 2 is attached to the goggle apparatus 150, or whether or not the main body apparatus 2 is in the halfway attached state where the main body apparatus 2 is being attached to the goggle apparatus 150. As an example, based on a detection result obtained by a connection terminal provided in the main body apparatus 2 and a connection terminal provided in the goggle apparatus 150 being electrically connected together by the main body apparatus 2 entering the attached state or the halfway attached state, or a detection result obtained by a predetermined switch mechanism provided in the main body apparatus 2 being turned on or off by the main body apparatus 2 entering the attached state or the halfway attached state, it may be detected whether or not the main body apparatus 2 is in the attached state where the main body apparatus 2 is attached to the goggle apparatus 150, or whether or not the main body apparatus 2 is in the halfway attached state where the main body apparatus 2 is being attached to the goggle apparatus 150. As another example, based on the image capturing result of image capturing means (an image sensor) provided in the main body apparatus 2, it may be determined whether or not a predetermined image is captured, or it may be determined whether or not captured luminance is greater than or equal to a threshold, thereby detecting whether or not the main body apparatus 2 is in the attached state where the main body apparatus 2 is attached to the goggle apparatus 150, or detecting whether or not the main body apparatus 2 is in the halfway attached state where the main body apparatus 2 is being attached to the goggle apparatus 150. Further, as another example, when the main body apparatus 2 enters the attached state where the main body apparatus 2 is attached to the goggle apparatus 150, or the halfway attached state where the main body apparatus 2 is being attached to the goggle apparatus 150, the user may be urged to perform a predetermined operation. Then, based on the fact that the predetermined operation is performed, it may be detected whether or not the main body apparatus 2 is in the attached state where the main body apparatus 2 is attached to the goggle apparatus 150, or whether or not the main body apparatus 2 is in the halfway attached state where the main body apparatus 2 is being attached to the goggle apparatus 150.

Further, in the above exemplary embodiment, the third area is set in a lower portion of the display 12 on the lower side of the center of the display 12 sandwiched between the first area and the second area of the display 12, thereby enabling a touch operation on the third area. Alternatively, the third area may be set in another area of the display 12. As a first example, the third area may be set in an upper portion of the display 12 on the upper side of the center of the display 12 sandwiched between the first area and the second area of the display 12. As a second example, the third area may be set in an upper portion (i.e., the upper left corner area of the display 12) or a lower portion (i.e., a lower left corner area of the display 12) sandwiched between the first area of the display 12 and the left end of the display 12. As a third example, the third area may be set in an upper portion (i.e., the upper right corner area of the display 12) or a lower portion (i.e., a lower right corner area of the display 12) sandwiched by the second area of the display 12 and the right end of the display 12. No matter which area the third area is set in, the user interface image IMUa matching the shape of the third area is displayed in the third area, and the opening portion 154h that enables a touch operation on the third area is formed in the goggle apparatus 150, thereby enabling an operation similar to that in the above description. It should be noted that when the third area is set between the first area and the second area sandwiched between the first area and the second area, the third area may be shifted to the left or the right from an intermediate position between the first area and the second area.

Further, in the above exemplary embodiment, as the function of a user interface image, the function of a user interface image displayed on the display 12 to receive a touch operation on the touch panel 13 is used as an example. Alternatively, the user interface image that does not receive a touch operation may be used. For example, the user interface image may be character information, an icon, or the like that does not enable a touch operation, but presents some information to the user. As an example, the user interface image may be an image representing the content of an instruction corresponding to a button operation or a stick operation on the left controller 3 or the right controller 4, the operation of moving the controller main body, or the like.

Further, the left-eye image IML and the right-eye image IMR may also be displayed outside the display area of the display 12 that can be viewed through the left-eye lens 153L and the right-eye lens 153R (typically, outside the first area and/or outside the second area), and parts of the left-eye image IML and the right-eye image IMR may also be displayed in the third area where a touch operation can be performed. Further, the left-eye image IML and the right-eye image IMR may be displayed in a range smaller than that of the display area of the display 12 that can be viewed through the left-eye lens 153L and the right-eye lens 153R (typically, the first area and/or the second area).

Figure 17:
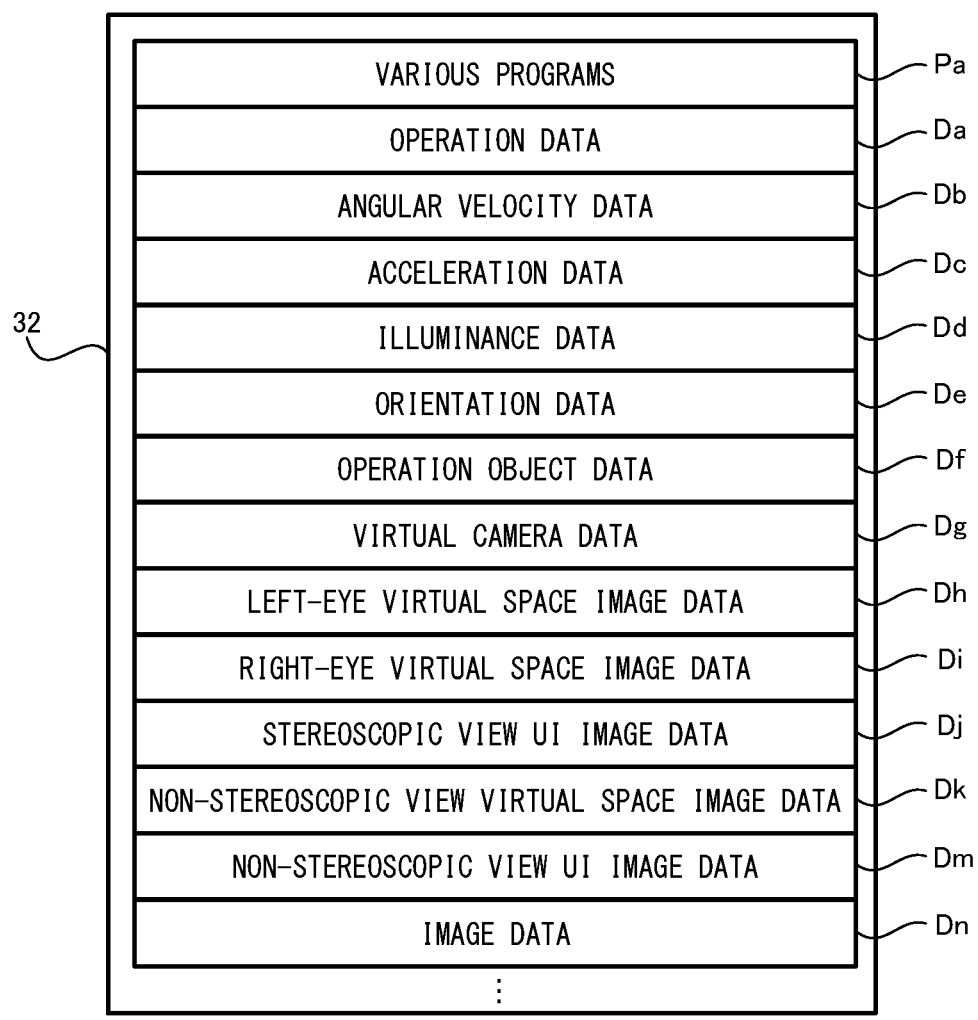
FIG. 17 is a diagram showing a non-limiting example of a data area of a DRAM 85 of the main body apparatus 2.
Figure 18:
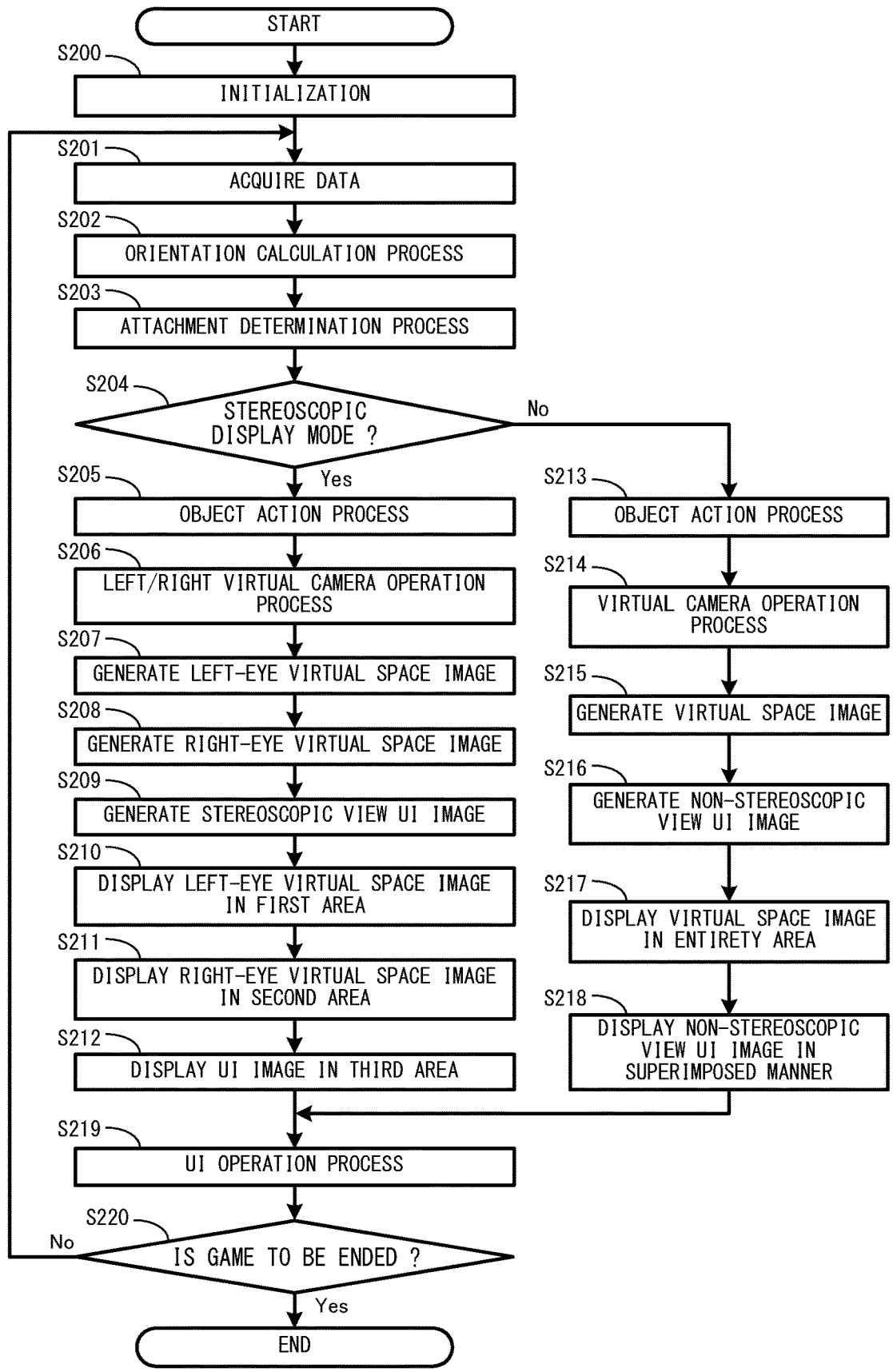
FIG. 18 is a flow chart showing a non-limiting example of game processing executed by the game system 1.

Next, with reference to FIGS. 17 and 18, a description is given of an example of a specific process executed by the game system 1 in the exemplary embodiment. FIG. 17 is a diagram showing an example of a data area set in the DRAM 85 of the main body apparatus 2 in the exemplary embodiment. It should be noted that in the DRAM 85, in addition to the data shown in FIG. 17, data used in another process is also stored, but is not described in detail here.

In a program storage area of the DRAM 85, various programs Pa, which are executed by the game system 1, are stored. In the exemplary embodiment, as the various programs Pa, a communication program for wirelessly communicating with the left controller 3 and the right controller 4, an application program for performing information processing (e.g., game processing) based on data acquired from the operation sections (the left controller 3, the right controller 4, the touch panel 13, the acceleration sensor 89, and the angular velocity sensor 90), the illuminance sensor 29, and the like are stored. It should be noted that the various programs Pa may be stored in advance in the flash memory 84, or may be acquired from a storage medium attachable to and detachable from the game system 1 (e.g., a predetermined type of a storage medium attached to the slot 23) and stored in the DRAM 85, or may be acquired from another apparatus via a network such as the Internet and stored in the DRAM 85. The processor 81 executes the various programs Pa stored in the DRAM 85.

Further, in a data storage area of the DRAM 85, various data used for processes such as a communication process and information processing executed by the game system 1 is stored. In the exemplary embodiment, in the DRAM 85, operation data Da, angular velocity data Db, acceleration data Dc, illuminance data Dd, orientation data De, operation object data Df, virtual camera data Dg, left-eye virtual space image data Dh, right-eye virtual space image data Di, stereoscopic view UI (user interface) image data Dj, non-stereoscopic view virtual space image data Dk, non-stereoscopic view UI (user interface) image data Dm, image data Dn, and the like are stored.

The operation data Da is operation data appropriately acquired from each of the left controller 3 and/or the right controller 4 and the touch panel 13. As described above, operation data transmitted from each of the left controller 3 and/or the right controller 4 and the touch panel 13 includes information regarding an input (specifically, information regarding an operation or the detection result of each sensor) from each of the input sections (specifically, buttons, analog sticks, and sensors). In the exemplary embodiment, operation data is transmitted in a predetermined cycle from each of the left controller 3 and/or the right controller 4 through wireless communication, and the operation data Da is appropriately updated using the received operation data. It should be noted that the update cycle of the operation data Da may be such that the operation data Da is updated every frame, which is the cycle of the processing described later executed by the main body apparatus 2, or is updated every cycle in which the above operation data is transmitted through the wireless communication. Further, operation data indicating that the touch panel 13 is operated is acquired in each cycle of the above processing, stored in the operation data Da in accordance with the acquisition, and updated.

The angular velocity data Db is data indicating angular velocities generated in the main body apparatus 2 and detected by the angular velocity sensor 90. For example, the angular velocity data Db includes data indicating angular velocities about the xyz axes generated in the main body apparatus 2, and the like.

The acceleration data Dc is data indicating accelerations generated in the main body apparatus 2 and detected by the acceleration sensor 89. For example, the acceleration data Dc includes data indicating accelerations in the xyz axis directions generated in the main body apparatus 2, and the like.

The illuminance data Dd is data indicating the illuminance of the periphery of the main body apparatus 2 detected by the illuminance sensor 29.

The orientation data De is data indicating the orientation of the main body apparatus 2 in real space. As an example, the orientation data De includes data indicating the orientation based on a gravity vector indicating a gravitational acceleration generated in the main body apparatus 2, and data indicating a change in the orientation of the main body apparatus 2.

The operation object data Df is data indicating the position, the direction, the orientation, the action, and the like in the virtual space of an object operated by the user.

The virtual camera data Dg is data indicating the position, the direction, the viewing angle, the magnification, and the like of a virtual camera (the pair of left and right virtual cameras in the stereoscopic display mode and the single virtual camera in the non-stereoscopic display mode) set in the virtual space.

The left-eye virtual space image data Dh is data for generating the left-eye image IML in the stereoscopic display mode. The right-eye virtual space image data Di is data for generating the right-eye image IMR in the stereoscopic display mode. The stereoscopic view UI image data Dj is data indicating the position, the shape, the size, and the like of the user interface image IMUa in the stereoscopic display mode.

The non-stereoscopic view virtual space image data Dk is data for generating the single image IMS in the non-stereoscopic display mode. The non-stereoscopic view UI image data Dm is data indicating the position, the shape, the size, and the like of the user interface image IMUb in the non-stereoscopic display mode.

The image data Dn is data for displaying images (e.g., an image of a virtual object, a user interface image, an information image, a field image, a background image, and the like) on the display screen when a game is performed.

Next, with reference to FIG. 18, a detailed example of information processing (game processing) according to the exemplary embodiment is described. FIG. 18 is a flow chart showing an example of game processing executed by the game system 1. In the exemplary embodiment, a series of processes shown in FIG. 18 is performed by the processor 81 executing a communication program or a predetermined application program (a game program) included in the various programs Pa. Further, the information processing shown in FIG. 18 is started at any timing.

It should be noted that the processes of all of the steps in the flow chart shown in FIG. 18 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the processor 81 performs the processes of all of the steps in the flow chart. Alternatively, a processor or a dedicated circuit other than the processor 81 may perform the processes of some of the steps in the flow chart. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIG. 18 may be executed by the cooperation of a plurality of information processing apparatuses including the main body apparatus 2.

In FIG. 18, the processor 81 performs initialization in the game processing (step S200), and the processing proceeds to the next step. For example, in the initialization, the processor 81 initializes parameters for performing the processing described below. As an example, using acceleration data stored in the acceleration data Dc, the processor 81 calculates the direction of a gravity vector of a gravitational acceleration acting on the main body apparatus 2 and sets the initial orientation of the main body apparatus 2 based on the direction of the gravity vector, thereby updating the orientation data De. Further, the processor 81 sets the initial orientation of the virtual camera in the virtual space so that the direction of the initial orientation of the virtual camera is similar to a direction in the relationships between the direction of the gravity vector of the gravitational acceleration acting on the main body apparatus 2 and the xyz axis directions of the main body apparatus 2, thereby updating the virtual camera data Dg. Here, being similar to a direction in the relationships of the xyz axes of the main body apparatus 2 means having such a placement relationship that a positive z-axis direction (the depth direction of the screen) based on the direction of the gravitational acceleration in real space is the same as the direction of the line of sight of the virtual camera based on the direction of gravity in the virtual space, and a positive x-axis direction (the left direction of the screen) based on the direction of the gravitational acceleration in real space is the same as the left direction of the virtual camera based on the direction of gravity in the virtual space.

Next, the processor 81 acquires various pieces of data and updates the operation data Da, the angular velocity data Db, the acceleration data Dc, and the illuminance data Dd (step S201), and the processing proceeds to the next step. For example, the processor 81 acquires operation data from the left controller 3 and/or the right controller 4 and updates the operation data Da. Further, the processor 81 acquires touch operation data from the touch panel 13 and updates the operation data Da. Further, the processor 81 acquires inertia data (acceleration data and angular velocity data) from the inertial sensors (the acceleration sensor 89 and the angular velocity sensor 90) provided in the main body apparatus 2 and updates the acceleration data Dc and the angular velocity data Db. Further, the processor 81 acquires illuminance data from the illuminance sensor 29 and updates the illuminance data Dd.

Next, the processor 81 calculates the orientation of the main body apparatus 2 (step S202), and the processing proceeds to the next step. For example, using the acceleration data and the angular velocity data stored in the angular velocity data Db and the acceleration data Dc, the processor 81 calculates the direction of the gravity vector of the gravitational acceleration acting on the main body apparatus 2, thereby updating the orientation data De. Further, the processor 81 calculates the direction of rotation and the amount of rotation from the initial orientation of the main body apparatus 2, thereby updating the orientation data De. For example, the processor 81 calculates the direction of rotation and the amount of rotation about the xyz axis directions of the main body apparatus 2 in the initial orientation, thereby updating the orientation data De. It should be noted that the direction of rotation can be represented by the positivity and negativity of the amount of rotation. Thus, only data indicating the amount of rotation may be stored in the orientation data De. For example, the processor 81 may add the amount of rotation based on the angular velocity data acquired in step S202 in the current processing to the amount of rotation calculated in step S202 in the previous processing, thereby calculating a new amount of rotation.

Next, the processor 81 performs the process of determining whether or not the main body apparatus 2 is attached to the goggle apparatus 150 (step S203), and the processing proceeds to the next step. For example, based on a threshold for detecting the illuminance when the main body apparatus 2 is attached to the goggle apparatus 150, when the illuminance indicated by the illuminance data Dd indicates low illuminance less than the threshold, the processor 81 determines in the above step S203 that the main body apparatus 2 is attached to the goggle apparatus 150.

Next, the processor 81 determines whether or not the display mode is the stereoscopic display mode (step S204). For example, when it is determined in the attachment determination process in the above step S203 that the main body apparatus 2 is attached to the goggle apparatus 150, the determination is affirmative in the above step S204, and the processor 81 performs the processing in the stereoscopic display mode. On the other hand, when it is determined in the attachment determination process in the above step S203 that the main body apparatus 2 is not attached to the goggle apparatus 150, the determination is negative in the above step S204, and the processor 81 performs the processing in the non-stereoscopic display mode. Then, when the processor 81 performs the processing in the stereoscopic display mode, the processing proceeds to step S205. On the other hand, when the processor 81 performs the processing in the non-stereoscopic display mode, the processing proceeds to step S213.

In step S205, the processor 81 performs an object action process, and the processing proceeds to the next step. For example, with reference to the operation data Da, when the operation of causing an operation object in the virtual space to perform an action is performed, the processor 81 sets the motion of the operation object corresponding to the operation. Then, based on the set motion of the operation object, the processor 81 sets the position, the direction, the orientation, the action, and the like in the virtual space of the operation object, thereby updating the operation object data Df.

In the object action process in the above step S205, the following object action control is possible. As a first example, using as an operation target an operation object determined in advance, the operation object is caused to perform an action. In this case, based on inputs to the input sections of the left controller 3 and/or the right controller 4, the operation object determined in advance is moved, caused to perform an action, or deformed. As a second example, an operation object is selected as an operation target based on an operation, and the operation object is caused to perform an action. In this case, using as an operation target an operation object placed at a predetermined display position (e.g., an operation object displayed in a superimposed manner on an indicator displayed at the center of the display screen), based on inputs to the input sections of the left controller 3 and/or the right controller 4, the operation object selected as the operation target is moved, caused to perform an action, or deformed. As a third example, the operation object as the operation target is caused to perform an action based on a vibration to the goggle apparatus 150 to which the main body apparatus 2 is attached. For example, a gravitational acceleration component is removed from the accelerations in the xyz axis directions in the main body apparatus 2 indicated by the acceleration data Dc, and when the accelerations after the removal indicate that a vibration having a magnitude greater than or equal to a predetermined magnitude is applied to the main body apparatus 2, the operation object as the operation target is caused to perform an action in accordance with the vibration. It should be noted that as the method for extracting the gravitational acceleration, any method may be used. For example, an acceleration component averagely generated in the main body apparatus 2 may be calculated, and the acceleration component may be extracted as the gravitational acceleration.

Next, the processor 81 performs the process of causing the pair of left and right virtual cameras to operate (step S206), and the processing proceeds to the next step. For example, the processor 81 rotates the orientation of the pair of left and right virtual cameras in the virtual space by the amount of rotation calculated in step S202 from the initial orientation and sets the orientation, thereby updating the virtual camera data Dg. For example, in the state where the positional relationship between the pair of left and right virtual cameras is fixed, the processor 81 rotates from the initial orientation the virtual cameras about the left-right direction of the virtual cameras by the same amount as the amount of rotation about the left-right axial direction (the x-axis direction) of the main body apparatus 2 calculated in step S202, rotates from the initial orientation the virtual cameras about the up-down direction of the virtual cameras by the same amount as the amount of rotation about the up-down axial direction (the y-axis direction) of the main body apparatus 2 calculated in step S202, and rotates from the initial orientation the virtual cameras about the direction of the line of sight of the virtual cameras by the same amount as the amount of rotation about the screen depth axial direction (the z-axis direction) of the main body apparatus 2 calculated in step S202, thereby setting the orientation of the pair of left and right virtual cameras in the virtual space.

Next, the processor 81 performs the process of generating a left-eye virtual space image (step S207), and the processing proceeds to the next step. For example, based on the operation object data Df, the processor 81 places the operation object in the virtual space. Then, the processor 81 generates a virtual space image viewed from, between the pair of left and right virtual cameras set in the virtual camera data Dg, the left virtual camera as a left-eye virtual space image, thereby updating the left-eye virtual space image data Dh.

Next, the processor 81 performs the process of generating a right-eye virtual space image (step S208), and the processing proceeds to the next step. For example, the processor 81 generates a virtual space image viewed from, between the pair of left and right virtual cameras set in the virtual camera data Dg, the right virtual camera as a right-eye virtual space image, thereby updating the right-eye virtual space image data Di.

Next, the processor 81 performs the process of generating a stereoscopic view user interface image (step S209), and the processing proceeds to the next step. For example, the processor 81 generates a stereoscopic view user interface image matching the shape of the third area of the display 12 (see FIG. 9), thereby updating the stereoscopic view UI image data Dj.

Next, the processor 81 performs a display control process for displaying the left-eye virtual space image in the first area of the display 12 (step S210), and the processing proceeds to the next step. For example, the processor 81 displays the left-eye virtual space image set in the left-eye virtual space image data Dh as the left-eye image IML in the entirety of the first area of the display 12 (see FIG. 9).

Next, the processor 81 performs a display control process for displaying the right-eye virtual space image in the second area of the display 12 (step S211), and the processing proceeds to the next step. For example, the processor 81 displays the right-eye virtual space image set in the right-eye virtual space image data Di as the right-eye image IMR in the entirety of the second area of the display 12 (see FIG. 9).

Next, the processor 81 performs a display control process for displaying the stereoscopic view UI image in the third area of the display 12 (step S212), and the processing proceeds to step S219. For example, the processor 81 displays the user interface image set in the stereoscopic view UI image data Dj as the user interface image IMUa (e.g., the two user interface images IMUa1 and IMUa2) at a predetermined position in the third area of the display 12 (see FIG. 9).

On the other hand, when it is determined in the above step S204 that the display mode is the non-stereoscopic display mode, then in step S213, the processor 81 performs an object action process, and the processing proceeds to the next step. For example, with reference to the operation data Da, when the operation of causing an operation object in the virtual space to perform an action is performed, the processor 81 sets the motion of the operation object corresponding to the operation. Then, based on the set motion of the operation object, the processor 81 sets the position, the direction, the orientation, the action, and the like in the virtual space of the operation object, thereby updating the operation object data Df. It should be noted that the object action process in the above step S213 is similar to the object action process in step S205 described above, and therefore is not described in detail.

Next, the processor 81 performs the process of causing the single virtual camera to operate (step S214), and the processing proceeds to the next step. For example, the processor 81 rotates the orientation of the single virtual camera in the virtual space by the amount of rotation calculated in step S202 from the initial orientation and sets the orientation, thereby updating the virtual camera data Dg. For example, the processor 81 rotates from the initial orientation the single virtual camera about the left-right direction of the virtual camera by the same amount as the amount of rotation about the left-right axial direction (the x-axis direction) of the main body apparatus 2 calculated in step S202, rotates from the initial orientation the single virtual camera about the up-down direction of the virtual camera by the same amount as the amount of rotation about the up-down axial direction (the y-axis direction) of the main body apparatus 2 calculated in step S202, and rotates from the initial orientation the single virtual camera about the direction of the line of sight of the virtual camera by the same amount as the amount of rotation about the screen depth axial direction (the z-axis direction) of the main body apparatus 2 calculated in step S202, thereby setting the orientation of the single virtual camera in the virtual space.

Next, the processor 81 performs the process of generating a virtual space image (step S215), and the processing proceeds to the next step. For example, the processor 81 generates a virtual space image viewed from the virtual camera set in the virtual camera data Dg, thereby updating the non-stereoscopic view virtual space image data Dk.

Next, the processor 81 performs the process of generating a non-stereoscopic view user interface image (step S216), and the processing proceeds to the next step. For example, the processor 81 generates a non-stereoscopic view user interface image to be displayed in a superimposed manner on the single image IMS on the display 12 (see FIG. 16), thereby updating the non-stereoscopic view UI image data Dm.

Next, the processor 81 performs a display control process for displaying the virtual space image in the entirety area of the display 12 (step S217), and the processing proceeds to the next step. For example, the processor 81 displays the virtual space image set in the non-stereoscopic view virtual space image data Dk as the single image IMS in the entirety area of the display 12 (see FIG. 16).

Next, the processor 81 performs a display control process for displaying the non-stereoscopic view UI image in a superimposed manner on the single image IMS (step S218), and the processing proceeds to step S219. For example, the processor 81 displays the user interface image set in the non-stereoscopic view UI image data Dm as the user interface image IMUb (e.g., the two user interface images IMUb1 and IMUb2) in a superimposed manner on the single image IMS in the upper left corner area and the upper right corner area of the display 12 (see FIG. 16).

In step S219, the processor 81 performs a user interface operation process, and the processing proceeds to the next step. For example, with reference to the operation data Da, when a touch operation is performed on the touch panel 13, the processor 81 sets a user operation instruction corresponding to the touch operation in accordance with the user interface image displayed on the display 12 overlapping the position where the touch operation is performed. Then, the processor 81 performs a process corresponding to the set user operation instruction.

Next, the processor 81 determines whether or not the game is to be ended (step S220). Examples of a condition for ending the game in the above step S220 include the fact that the result of the game is finalized, the fact that a user performs the operation of ending the game, and the like. When the game is not to be ended, the processing returns to the above step S201, and the process of step S201 is repeated. When the main game is to be ended, the processing of the flow chart ends. Hereinafter, the series of processes of steps S201 to S220 is repeatedly executed until it is determined in step S220 that the game is to be ended.

As described above, in the exemplary embodiment, when the normal display mode (the non-stereoscopic display mode) and the stereoscopic display mode are switched, a user interface image is displayed at positions different corresponding to the set display mode. Thus, it is possible to improve convenience regarding the presentation of a user interface image. Further, based on the state of the attachment of the main body apparatus 2 to the goggle apparatus 150, the display mode is automatically switched. Thus, it is possible to seamlessly switch the display mode. Further, in the exemplary embodiment, in the stereoscopic display mode, a user interface image is displayed in the third area different from the first area and the second area of the display 12 where the right-eye image and the left-eye image are displayed. Thus, it is possible to display a user interface image that does not hinder the display of a stereoscopic image.

It should be noted that in the above exemplary embodiment, the image display system is formed by attaching the main body apparatus 2 having an information processing function to the goggle apparatus 150. Alternatively, the image display system may be formed in another form. As a first example, an image display system that displays a stereoscopic image may be formed by providing in the goggle apparatus 150 a control section that generates an image by performing the above information processing (game processing), and attaching to the goggle apparatus 150 a display device having the function of displaying the image. In this case, the control section provided in the goggle apparatus 150 outputs image data for displaying a stereoscopic image and a user interface image on the display device to the display device, whereby the stereoscopic image and the user interface image are displayed on the display device. It should be noted that in the form of the first example, it does not matter which of the display device and the goggle apparatus 150 a mechanism for detecting the attachment situation of the display device, a mechanism for detecting the orientation of the image display system, a mechanism for receiving a user operation, and the like are provided in. As a second example, separately from the goggle apparatus 150 to which a display device is attached, a control apparatus connected in a wireless or wired manner to the display device may be provided, and an image display system may be formed of the display device, the goggle apparatus 150, and the control apparatus. In this case, operation data, acceleration data, angular velocity data, illuminance data, and the like are output from the display device to the control apparatus, and a content image and a user interface image in a display mode based on the illuminance data are output from the control apparatus to the display device. It should be noted that also in the form of the second example, it does not matter which of the display device and the goggle apparatus 150 a mechanism for detecting the attachment situation of the display device, a mechanism for detecting the orientation of the image display system, a mechanism for receiving a user operation, and the like are provided in. Then, in accordance with the operation data, the acceleration data, and the angular velocity data acquired from the display device and/or the goggle apparatus 150, the control apparatus controls the display range of the content image to be displayed and outputs the content image to the display device. It should be noted that in the exemplary embodiment, the main body apparatus 2 is used as an example of a display device.

It should be noted that in the above exemplary embodiment, the method for detecting the orientation of the main body apparatus 2 is merely an example. Alternatively, the orientation of the main body apparatus 2 may be detected using another method or another piece of data. As an example, the main body apparatus 2 and/or the goggle apparatus 150 to which the main body apparatus 2 is attached may be captured from outside, and the orientations of the main body apparatus 2 and/or the goggle apparatus 150 may be detected using the captured image. Further, a controller for controlling the action of an operation object may be not only the left controller 3 or the right controller 4, but also another controller.

Further, the game system 1 and/or the main body apparatus 2 may be any apparatus, and may be a mobile game apparatus, any mobile electronic device (a PDA (Personal Digital Assistant), a mobile phone, a smart device (a smartphone or the like), a personal computer, a camera, a tablet, or the like. If these pieces of hardware can execute a game application, any of these pieces of hardware can function as a game apparatus.

Further, in the above exemplary embodiment, an example has been used where a left-eye image and a right-eye image having parallax with each other are displayed on the left side and the right side of the screen of the display 12, whereby a stereoscopic image is displayed. Alternatively, the left-eye image and the right-eye image may be displayed on different screens from each other. For example, when the display 12 provided in the main body apparatus 2 is formed of a plurality of display screens, a left-eye image is displayed on one of the plurality of display screens, and a right-eye image is displayed on the other one of the plurality of display screens. In this case, the user views the left-eye image displayed on the one of the plurality of display screens through the left-eye lens 153L with their left eye and also views the right-eye image displayed on the other one of the plurality of display screens through the right-eye lens 153R with their right eye and thereby can view a stereoscopic image through the goggle apparatus 150.

Further, a stereoscopic image and a non-stereoscopic image to be displayed on the main body apparatus 2 are displayed as a game image by the processor 81 executing information processing (game processing) in accordance with a user operation, or displayed as a moving image or a still image by the processor 81 reproducing the moving image or reproducing the still image in accordance with a user operation. That is, a stereoscopic image and a non-stereoscopic image to be displayed on the main body apparatus 2 are generated by the processor 81 of the main body apparatus 2 performing information processing (e.g., game processing, a moving image reproduction process, or a still image reproduction process). Alternatively, at least a part of the process of generating the stereoscopic image and the non-stereoscopic image may be performed by another apparatus. For example, if the main body apparatus 2 is further configured to communicate with another apparatus (e.g., a server, another image display device, another game apparatus, another mobile terminal, or another information processing apparatus), the other apparatus may operate in conjunction with to perform the steps. Another apparatus may thus perform at least some of the steps, thereby enabling processing similar to that described above. Further, the above information processing can be performed by a processor or the cooperation of a plurality of processors, the processor or the plurality of processors included in an information processing system including at least one information processing apparatus. Further, in the above exemplary embodiment, information processing can be performed by the processor 81 of the main body apparatus 2 executing a predetermined program. Alternatively, part or all of the processing of the flow charts may be performed by a dedicated circuit included in the main body apparatus 2.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information above processing are merely illustrative. Thus, it goes without saying that the exemplary embodiment can be achieved also with other orders, other values, and other conditions.

Further, the above program may be supplied to the game system 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as an image display system, an image display program, an image display method, a display device, and the like that are capable of improving convenience regarding the presentation of a user interface image.

What is claimed is:

1. An image display system, comprising:
    a display device having a display screen configured to display an image;
    a goggle apparatus to which the display device is attachable; and
    processing circuitry including at least one processor, the processing circuitry configured to:
        set the display device to a first display mode or a second display mode different from the first display mode;
        display on the display screen, in the first display mode, a first image, including a content image, as a non-stereoscopic image, and a first user interface image, the first user interface image displayed at a first position on the display screen; and
        display on the display screen, in the second display mode, a second image, including the content image, composed of a left-eye image and a right-eye image having parallax with each other, and a second user interface image corresponding to the first user interface image, wherein
        in the second display mode, the second user interface image is displayed on the display screen so that the second user interface image is viewed at a second position different from the first position where the first user interface image is viewed based on the content image in the first display mode, and
        in the second display mode, the left-eye image is displayed in a first area of the display screen, the right-eye image is displayed in a second area of the display screen that is different from the first area, and the second user interface image is displayed in a third area of the display screen that is different from the first area and the second area, and an input operation can be made to the second user interface image on the display screen in a state where the display device is attached to the goggle apparatus.

2. The image display system according to claim 1, wherein
the processing circuitry is further configured to detect whether or not the display device is in an attached state where the display device is attached to the goggle apparatus, or detect whether or not the display device is in a halfway attached state where the display device is being attached to the goggle apparatus, and
when the display device is set to the first display mode, the display device is switched to the second display mode based on the detection result.

3. The image display system according to claim 2, wherein
the display device includes an illuminance sensor,
the goggle apparatus includes a light-shielding member configured to, when the display device is in the attached state where the display device is attached to the goggle apparatus, or is in the halfway attached state where the display device is being attached to the goggle apparatus, block light from the display device to the illuminance sensor, and
based on a detection result of the illuminance sensor, the processing circuitry detects whether or not the display device is in the attached state where the display device is attached to the goggle apparatus, or detects whether or not the display device is in the halfway attached state where the display device is being attached to the goggle apparatus.

4. The image display system according to claim 1, wherein
the display device includes a touch panel on the display screen,
the first user interface image displayed on the display screen enables an operation instruction corresponding to a touch operation on the touch panel, and
the second user interface image displayed on the display screen enables an operation instruction corresponding to a touch operation on the touch panel in a state where the display device is attached to the goggle apparatus.

5. The image display system according to claim 1, wherein
in the second display mode, the content image displayed in the first display mode immediately before being set in the second display mode is displayed as a stereoscopic image composed of a left-eye image and a right-eye image on the display screen.

6. The image display system according to claim 1, wherein
a user interface image that has substantially the same function as and has a different shape from the first user interface image is displayed as the second user interface image.

7. The image display system according to claim 6, wherein
in the second display mode, by adjusting a shape of the second user interface image to match a shape of a third area of the display screen that is different from the first area of the display screen for displaying the left-eye image and the second area of the display screen for displaying the right-eye image, the second user interface image is displayed in the third area.

8. The image display system according to claim 1, wherein the third area is set in an upper portion or a lower portion of the display screen that is sandwiched between the first area and the second area of the display screen.

9. An image display system, comprising:
a display device having a display screen configured to display an image;
a goggle apparatus to which the display device is attachable; and
processing circuitry including at least one processor, the processing circuitry configured to:
set the display device to a first display mode or a second display mode different from the first display mode;
display on the display screen, in the first display mode, a first image, including a content image, as a non-stereoscopic image, and a first user interface image, the first user interface image displayed at a first position on the display screen; and
display on the display screen, in the second display mode, a second image, including the content image, composed of a left-eye image and a right-eye image having parallax with each other, and a second user interface image corresponding to the first user interface image, wherein
in the second display mode, the second user interface image is displayed on the display screen so that the second user interface image is viewed at a second position different from the first position where the first user interface image is viewed based on the content image in the first display mode,
in the second display mode, the left-eye image is displayed in a first area of the display screen, the right-eye image is displayed in a second area of the display screen that is different from the first area, and the second user interface image is displayed in a third area of the display screen that is different from the first area and the second area, and
the third area is set in a lower portion of the display screen that is sandwiched between the first area and the second area of the display screen.

10. The image display system according to claim 1, wherein
the goggle apparatus includes an opening portion configured to, when the display device is attached to the goggle apparatus, expose the third area that is a part of the display screen at least to outside.

11. The image display system according to claim 10, wherein
the opening portion is formed at a position corresponding to a nose of a user when the user wears the goggle apparatus.

12. The image display system according to claim 1, wherein
in the first display mode, the first user interface image is displayed in a superimposed manner on a content image displayed on the display screen.

13. The image display system according to claim 1, wherein
in the second display mode, the second user interface image is displayed as a non-stereoscopic image on the display screen.

14. The image display system according to claim 2, wherein
the display device further includes a display device side connection end configured to electrically connect to another apparatus, the goggle apparatus includes a goggle apparatus side connection end configured to electrically connect to the display device side connection end, and in accordance with a connection between the display device side connection end and the goggle apparatus side connection end, the processing circuitry is configured to detect whether or not the display device is in an attached state where the display device is attached to the goggle apparatus, or detect whether or not the display device is in a halfway attached state where the display device is being attached to the goggle apparatus.

15. A non-transitory computer-readable storage medium having stored therein an image display program executed by a computer included in a display device having a display screen configured to display an image, the display device configured to attach to a goggle apparatus, and the image display program causing the computer to provide execution comprising:

setting the display device to a first display mode or a second display mode different from the first display mode;

displaying on the display screen, in the first display mode, a first image, including a content image, as a non-stereoscopic image, and a first user interface image, the first user interface image displayed at a first position on the display screen; and displaying on the display screen, in the second display mode, a second image, including the content image, composed of a left-eye image and a right-eye image having parallax with each other, and a second user interface image corresponding to the first user interface image, wherein in the second display mode, the second user interface image is displayed on the display screen so that the second user interface image is viewed at a second position different from the first position where the first user interface image is viewed based on the content image in the first display mode, and in the second display mode, the left-eye image is displayed in a first area of the display screen, the right-eye image is displayed in a second area of the display screen that is different from the first area, and the second user interface image is displayed in a third area of the display screen that is different from the first area and the second area, and an input operation can be made to the second user interface image on the display screen in a state where the display device is attached to the goggle apparatus.

16. An image display method for displaying an image on a display device having a display screen configured to display an image, the display device configured to attach to a goggle apparatus, and the image display method comprising:

setting the display device to a first display mode or a second display mode different from the first display mode;

displaying on the display screen, in the first display mode, a first image, including a content image, as a non-stereoscopic image, and a first user interface image, the first user interface image displayed at a first position on the display screen; and displaying on the display screen, in the second display mode, a second image, including the content image, composed of a left-eye image and a right-eye image having parallax with each other, and a second user interface image corresponding to the first user interface image, wherein in the second display mode, the second user interface image is displayed on the display screen so that the second user interface image is viewed at a second position different from the first position where the first user interface image is viewed based on the content image in the first display mode, and in the second display mode, the left-eye image is displayed in a first area of the display screen, the right-eye image is displayed in a second area of the display screen that is different from the first area, and the second user interface image is displayed in a third area of the display screen that is different from the first area and the second area, and an input operation can be made to the second user interface image on the display screen in a state where the display device is attached to the goggle apparatus.

17. A display device having a display screen configured to display an image, the display device configured to attach to a goggle apparatus, and the display device comprising:

a processor; and a memory configured to store computer readable instructions that, when executed by the processor, cause the display device to:

set the display device to a first display mode or a second display mode different from the first display mode;

display on the display screen, in the first display mode, a first image, including a content image, as a non-stereoscopic image, and a first user interface image, the first user interface image displayed at a first position on the display screen; and display on the display screen, in the second display mode, a second image, including the content image, composed of a left-eye image and a right-eye image having parallax with each other, and a second user interface image corresponding to the first user interface image, wherein in the second display mode, the second user interface image is displayed on the display screen so that the second user interface image is viewed at a second position different from the first position where the first user interface image is viewed based on the content image in the first display mode, and in the second display mode, the left-eye image is displayed in a first area of the display screen, the right-eye image is displayed in a second area of the display screen that is different from the first area, and the second user interface image is displayed in a third area of the display screen that is different from the first area and the second area, and an input operation can be made to the second user interface image on the display screen in a state where the display device is attached to the goggle apparatus.

18. The image display system according to claim 1, wherein the first user interface image is displayed in a first display form in the first display mode, and the second user interface image, corresponding to the first user interface image, is displayed in a second display form in the second display mode.

19. The image display system according to claim 1, wherein the first user interface image is displayed with a first size in the first display mode, and the second user interface image, corresponding to the first user interface image, is displayed with a second size, smaller than the first size, in the second display mode.

20. The image display system according to claim 1, wherein the input operation can be made inside the goggle apparatus in the state where the display device is attached to the goggle apparatus and as a user wears the goggle apparatus.

* * * * *